(12) United States Patent
Hidaka

(10) Patent No.: US 7,735,594 B2
(45) Date of Patent: Jun. 15, 2010

(54) WORKING VEHICLE

(75) Inventor: Shigemi Hidaka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 566 days.

(21) Appl. No.: 11/664,368

(22) PCT Filed: May 2, 2005

(86) PCT No.: PCT/JP2005/008302

§ 371 (c)(1),
(2), (4) Date: Mar. 30, 2007

(87) PCT Pub. No.: WO2006/038337

PCT Pub. Date: Apr. 13, 2006

(65) Prior Publication Data

US 2007/0193816 A1    Aug. 23, 2007

(30) Foreign Application Priority Data

Oct. 1, 2004    (JP) .............................. 2004-290666

(51) Int. Cl.
 *B62D 21/00* (2006.01)
(52) U.S. Cl. ...................................... 180/312; 180/311
(58) Field of Classification Search ................ 180/69.2, 180/69.21, 900, 291, 292, 305–307, 311, 180/312, 367
See application file for complete search history.

(56) References Cited

U.S. PATENT DOCUMENTS

| 1,679,990 A | | 8/1928 | Schjolin |
| 2,044,714 A | | 6/1936 | Trott |
| 3,841,426 A | * | 10/1974 | Nemschoff ................ 180/53.1 |
| 4,145,883 A | * | 3/1979 | Forster ........................ 60/458 |
| 4,562,898 A | * | 1/1986 | Huang ........................ 180/292 |
| 4,691,802 A | | 9/1987 | Ishimori et al. |
| 4,856,279 A | * | 8/1989 | Kawahara et al. ............. 60/489 |
| 4,875,390 A | * | 10/1989 | Hayashi et al. ............... 60/445 |

(Continued)

FOREIGN PATENT DOCUMENTS

EP    1449703    8/2004

(Continued)

OTHER PUBLICATIONS

International Search Report from the corresponding PCT/JP2005/008302, mailed Aug. 9, 2005.

*Primary Examiner*—S. Joseph Morano
*Assistant Examiner*—Vaughn T Coolman
(74) *Attorney, Agent, or Firm*—Hamre, Schumann, Mueller & Larson, P.C.

(57) ABSTRACT

There is provided a working vehicle 1 including the right and left vehicle frames reinforced by an upper connecting member and a lower connecting member near the engine, thereby eliminating the conventional need for e.g. highly rigid cylindrical members in constructing the right and left vehicle frames.

An engine frame for mounting an engine are connected with a pair of right and left vehicle frames, and a transmission case is placed between rear portions of the right and left vehicle frames. The right and the left vehicle frames are connected via an upper connecting member and a lower connecting member. The engine has an output portion provided with a flywheel, which has its outer circumference surrounded by the right and the left vehicle frames and the upper and the lower connecting members.

10 Claims, 26 Drawing Sheets

U.S. PATENT DOCUMENTS

| | | | |
|---|---|---|---|
| 5,046,994 A | 9/1991 | Hasegawa et al. | |
| 5,058,382 A * | 10/1991 | Inoue et al. | 60/488 |
| 5,248,237 A * | 9/1993 | Nakamura | 414/686 |
| 5,562,179 A * | 10/1996 | McAdam | 180/379 |
| 6,250,414 B1 * | 6/2001 | Sato et al. | 180/307 |
| 6,381,957 B1 * | 5/2002 | Hori et al. | 60/436 |
| 6,488,108 B1 * | 12/2002 | Boll | 180/65.25 |
| 6,722,464 B2 * | 4/2004 | Nakatani et al. | 180/305 |
| 6,726,436 B2 * | 4/2004 | Baumann et al. | 414/680 |
| 6,758,301 B2 * | 7/2004 | Shiba et al. | 180/383 |
| 6,918,850 B2 * | 7/2005 | Hasegawa et al. | 475/72 |
| 7,032,701 B2 * | 4/2006 | Yoshida et al. | 180/291 |
| 7,036,622 B2 * | 5/2006 | Iwaki | 180/311 |
| 7,047,839 B2 * | 5/2006 | Ishii et al. | 74/606 R |
| 7,225,704 B2 * | 6/2007 | Ishii et al. | 74/606 R |
| 7,370,714 B2 * | 5/2008 | Yasuda et al. | 180/53.4 |
| 2002/0043057 A1 * | 4/2002 | Shiba et al. | 56/1 |
| 2002/0153190 A1 * | 10/2002 | Iwaki | 180/311 |
| 2003/0162618 A1 * | 8/2003 | Hasegawa et al. | 475/72 |
| 2004/0222032 A1 | 11/2004 | Nakatani et al. | |

FOREIGN PATENT DOCUMENTS

| | | |
|---|---|---|
| JP | 52-83118 | 6/1977 |
| JP | 59-7904 | 1/1984 |
| JP | 61-89923 | 6/1986 |
| JP | 63-53885 | 4/1988 |
| JP | 63-152770 | 6/1988 |
| JP | 1-202582 | 8/1989 |
| JP | 4-73017 | 11/1992 |
| JP | 11-334395 | 12/1999 |
| JP | 2003-252236 | 9/2003 |
| JP | 3526674 | 2/2004 |
| JP | 2004-255918 | 9/2004 |
| JP | 2004-270803 | 9/2004 |

* cited by examiner

WORKING VEHICLE

TECHNICAL FIELD

The present invention relates to working vehicles such as tractors used in agricultural practices and wheel loaders used in civil engineering works.

BACKGROUND ART

Conventionally, the above-described tractors or the wheel loaders generally have their engine mounted in a front portion of the traction unit chassis, and a transmission case mounted in a rear portion of the traction unit chassis, and the traction unit chassis is supported by front and rear wheels. In the above construction, the engine is mounted in a front portion of the traction unit chassis and the transmission case is disposed in a rear portion of the traction unit chassis (Patent Document 1 for example).

Further, the traction unit chassis includes an engine frame and a right and a left vehicle frames. The engine is mounted where the engine frame is connected with the vehicle frames while the transmission case is disposed between the right and left vehicle frames (Patent Document 2 for example).

Patent Document 1: JP-A-H11-334395
Patent Document 2: JP-A-2003-252236

DISCLOSURE OF THE INVENTION

Problems to be Solved by the Invention

However, vibration isolation members, on which the engine is installed, are attached to fittings provided on the vehicle frames, and the engine is mounted between the right and left vehicle frames. For this reason, the right and left vehicle frames have to be made of highly rigid cylindrical members for example, and this has been a source of problems such as difficulty in weight reduction in the traction unit chassis as well as cost reduction.

An object of the present invention is to provide a working vehicle including the right and left vehicle frames reinforced by an upper connecting member and a lower connecting member near the engine, thereby eliminating the conventional need for highly rigid cylindrical members in constructing the right and left vehicle frames.

Means for Solving the Problems

In order to achieve the object, a working vehicle according to Claim 1 includes an engine frame for mounting an engine, and a pair of right and left vehicle frames. A rear portion of the engine frame is connected with front portions of the vehicle frames, and a transmission case is placed between rear portions of the right and left vehicle frames. The right and the left vehicle frames are connected via an upper connecting member and a lower connecting member, the engine has an output portion provided with a flywheel, and the flywheel has an outer circumference surrounded by the right and the left vehicle frames and the upper and the lower connecting members.

The invention according to Claim 2 provides the working vehicle according to Claim 1, where the upper connecting member has an upper surface side used for disposing fittings for the engine, a bonnet and so on.

The invention according to Claim 3 provides the working vehicle according to Claim 1 or 2, where the lower connecting member supports an intermediate bearing member for a driving shaft which transmits power from the transmission case to wheels.

The invention according to Claim 4 provides the working vehicle according to Claim 1 or 2, where one of the right and the left vehicle frames is removable from the engine frame and the transmission case while the other of the vehicle frames stays connected to the engine frame and the transmission case.

The invention according to Claim 5 provides the working vehicle according to Claim 1 with the following arrangements: The vehicle frames have rear portions extended to side surfaces of the transmission case, the rear portion of the vehicle frame is penetrated by a frame pin from an outer side of the vehicle frame. The frame pin has a tip portion fitted into the side surface of the transmission case. The frame pin has a base portion provided with a pin fastening member, and the pin fastening member is fastened to an outer side surface of the transmission case.

The invention according to Claim 6 provides the working vehicle according to Claim 5, where the frame pin is penetrated by a tightening bolt from an outer side of the pin fastening member, and the tightening bolt is threaded to the transmission case.

The invention according to Claim 7 provides the working vehicle according to Claim 5 or 6, where at least one of the pin fastening members is formed with a lid for attachment to an oil filter inside the transmission case.

The invention according to Claim 8 provides the working vehicle according to Claim 1 or 5 with the following arrangements: The transmission case incorporates an input shaft for transmitting power from the engine. The input shaft is inserted into an output shaft for relative rotation thereto. The input shaft is mounted with a cylinder block, a hydrostatic pump portion on one side of the cylinder block and a hydrostatic motor portion on the other side of the cylinder block as part of a hydrostatic transmission. The hydrostatic motor portion provides power via the output shaft at least to right and left wheels. With the above-described arrangements, the hydrostatic motor portion is disposed between an input side of the input shaft and the cylinder block, and the input side of the input shaft and an output side of the output shaft are on the same side.

The invention according to Claim 9 provides the working vehicle according to Claim 8 with the following arrangements: The transmission case has its inside partitioned into a front and a rear portions. The front portion in the transmission case incorporates a transmission gear mechanism. The rear portion in the transmission case incorporates the hydrostatic transmission and a differential gear mechanism for transmission of power to the right and left wheels.

The invention according to Claim 10 provides the working vehicle according to Claim 8, where the hydrostatic transmission and the differential gear mechanism for transmission of power to the right and left wheels are incorporated in a rear portion of the transmission case, and the hydrostatic transmission is removable toward the rear of the transmission case.

The invention according to Claim 11 provides the working vehicle according to Claim 10, where the output shaft is rotatably supported by a bearing inside the transmission case, and the hydrostatic motor portion has a swash plate connected with the output shaft detachably by spline in an axial direction of the input shaft.

Advantages of the Invention

According to the invention disclosed in Claim 1, the working vehicle includes an engine frame for mounting an engine, and a pair of right and left vehicle frames. A rear portion of the engine frame is connected with front portions of the vehicle frames, and between rear portions of the right and left vehicle frames, a transmission case is placed. With the above, the right and the left vehicle frames are connected via an upper connecting member and a lower connecting member, the engine has an output portion provided with a flywheel, and the flywheel has an outer circumference surrounded by the right and the left vehicle frames and the upper and the lower connecting members. Therefore, it is possible to reinforce the right and left vehicle frames near the engine, with the upper connecting member and the lower connecting member. Thus, unlike the convention, it is no longer necessary to use highly rigid cylindrical members for example, in constructing the right and left vehicle frames. The upper and the lower connecting members can be used to improve rigidity of the right and left vehicle frames and to protect the flywheel. The present invention enables to simplify, or reduce the weight of the traction unit chassis in a tractor for example, and thereby to reduce manufacturing cost thereof.

According to the invention disclosed in Claim 2, fittings for the engine, a bonnet, etc. are disposed on an upper surface side of the upper connecting member. This means that the fittings can be disposed at an intermediate height on two sides of the engine. Thus, it is possible for example, to provide an engine mount (vibration isolation members) and fittings for the bonnet (hinges for open/close pivotal movement) compactly above the flywheel.

According to the invention disclosed in Claim 3, the driving shaft which transmits power from the transmission case to the wheels has its intermediate bearing member supported by the lower connecting member. This enables to reduce vibration of the driving shaft at the lower connecting member, and therefore to provide the driving shaft closely to e.g. the bottom of the engine.

According to the invention disclosed in Claim 4, one of the right and the left vehicle frames is removable from the engine frame and the transmission case while the other of the vehicle frames stays connected to the engine frame and the transmission case. This allows the engine frame and the right and the left vehicle frames to be machined and assembled separately from each other as three independent components. Thus, it becomes possible to increase ease of handling of the traction unit chassis as compared to conventional construction in which the engine frame is integrally connected with the right and left vehicle frames for example.

According to the invention disclosed in Claim 5, the vehicle frames have rear portions extended to side surfaces of the transmission case, the rear portion of the vehicle frame is penetrated by a frame pin from an outer side of the vehicle frame, the frame pin has a tip portion fitted into the side surface of the transmission case, the frame pin has a base portion provided with a pin fastening member, and the pin fastening member is fastened to an outer side surface of the transmission case. This enables to support the vehicle frames at an intermediate portion of the frame pin in a dual-end supporting structure in which the frame pin is supported on its both ends by the transmission case and the pin fastening member, enabling to provide sufficient connection strength between the vehicle frames and the transmission case. This enables to reduce manufacturing cost of the chassis or the transmission case of the tractor for example, as compared to the conventional structure of bolting the vehicle frames to the transmission case.

According to the invention disclosed in Claim 6, the frame pin is penetrated by a tightening bolt from an outer side of the pin fastening member, and the tightening bolt is threaded to the transmission case. This means that the connection between the vehicle frames and the transmission case is accomplished by dual shafts provided by the frame pin and the tightening bolt, enabling to improve connection rigidity between the vehicle frame and the transmission case.

According to the invention disclosed in Claim 7, at least one of the pin fastening members is formed with a lid for attachment to an oil filter inside the transmission case. This allows removing of the oil filter by removing the pin fastening member from the outer side surface of the transmission case, enabling to improve ease of maintenance of the oil filter.

According to the invention disclosed in Claim 8, the transmission case incorporates an input shaft for transmitting power from the engine, and the input shaft is inserted into an output shaft for relative rotation thereto. The input shaft is mounted with: a cylinder block, a hydrostatic pump portion on one side of the cylinder block, and a hydrostatic motor portion on the other side of the cylinder block, as part of a hydrostatic transmission. The hydrostatic motor portion provides power via the output shaft at-least to right and left wheels. With the above arrangements, the hydrostatic motor portion is disposed between an input side of the input shaft and the cylinder block, and the input side of the input shaft and an output side of the output shaft are on the same side. This enables, for example, to secure a space for providing the hydrostatic transmission at a rear of the transmission case even in a tractor-type transmission structure in which traction sub transmission gears, differential gears and PTO speed shift gears, etc. are all provided inside the transmission case. A space is secured for e.g. the PTO speed shift gears or the traction sub transmission gears, etc. in front of the transmission case which is on the input side of the input shaft, making possible to reduce the size or weight of e.g. the transmission case of the tractor, and to reduce manufacturing cost.

According to the invention disclosed in Claim 9, the transmission case has its inside partitioned into a front and a rear portions, the front portion in the transmission case incorporates a transmission gear mechanism, and the rear portion in the transmission case incorporates the hydrostatic transmission and the differential gear mechanism for transmission of power to the right and left wheels. This enables compact layout of the hydrostatic transmission through the use of rear space in the transmission case which incorporates the differential gear mechanism. Further, inside space of e.g. a box-shaped transmission case is now used efficiently, with the transmission gear mechanisms such as the PTO speed shift gears or the traction sub transmission gears placed in the front portion of the transmission case, and the hydrostatic transmission and the differential gear mechanism being placed in the rear portion of the transmission case, enabling compact layout of the hydrostatic transmission. This makes possible to reduce the size or weight of e.g. the transmission case of the tractor, and to reduce manufacturing cost.

According to the invention disclosed in Claim 10 the hydrostatic transmission and the differential gear mechanism for transmission of power to the right and left wheels are incorporated in a rear portion of the transmission case, and the hydrostatic transmission is removable toward the rear of the transmission case. This enables, for example, to secure a space for providing the hydrostatic transmission at a rear of the transmission case even in a tractor-type transmission structure in which traction sub transmission gears, differential gears and PTO speed shift gears, etc. are all provided inside the transmission case. The hydrostatic transmission can now be assembled and disassembled, with the differential gear mechanism as assembled. A space is secured for e.g. the traction sub transmission gears or the PTO speed shift gears, in front of the transmission case which is on the input side of the input shaft, making possible to reduce the size or weight of e.g. the transmission case of the tractor, and to improve operability in e.g. assembling and disassembling, leading to reduced manufacturing cost.

According to the invention disclosed in Claim 11, the output shaft is rotatably supported by a bearing inside the transmission case, and the hydrostatic motor portion has a swash plate connected with the output shaft detachably by spline in an axial direction of the input shaft. This enables to place the transmission gear mechanisms such as the traction sub transmission gear or the PTO speed shift gear in the front portion of the transmission case, and the hydrostatic transmission and the differential gear mechanism in the rear portion of the transmission case, through efficient utilization of the inside space of e.g. a box-shaped transmission case. Therefore, it is now possible to dispose the hydrostatic transmission compactly, enabling to reduce e.g. the size or weight of the transmission case of the tractor, to improve workability in assembling, disassembling and so on, and to reduce manufacturing cost. The hydrostatic pump portion is disposed on one side of the cylinder block while the hydrostatic motor portion is on the other side. The hydrostatic transmission can now be assembled to or disassembled from the transmission case, with the hydrostatic pump portion and the hydrostatic motor portion sandwiching the cylinder block on the input shaft. The output shaft is now supported in the transmission case independently with respect to the hydrostatic transmission. The hydrostatic transmission can now be assembled to and disassembled from the transmission case while the output shaft stays supported by the transmission case, providing a structure which allows easy assembly or disassembly of the hydrostatic transmission.

DESCRIPTION OF SIGNS

Figure 1:
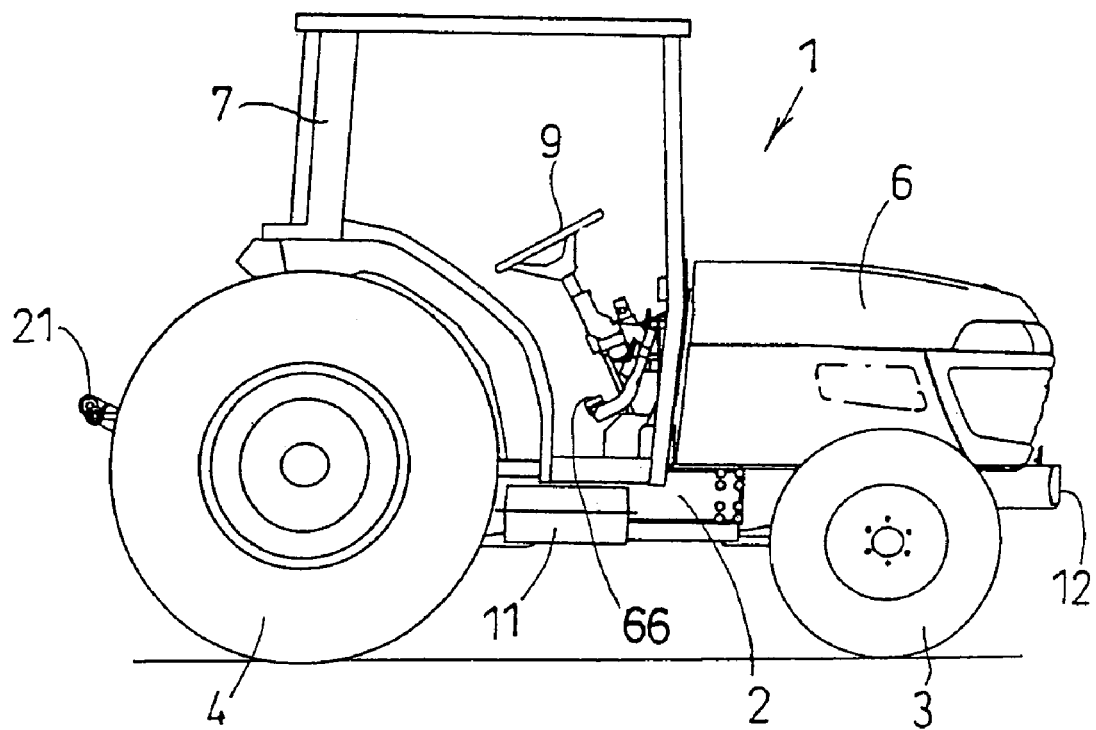
FIG. 1 is a side view of an agricultural tractor.

3 Front wheel
5 Engine
6 Bonnet
14 Engine frame
16 Vehicle frame
17 Transmission case
25 Flywheel
85 Front-wheel drive shaft (Driving shaft)
250 Upper connecting member
251 Lower connecting member
254 Rear vibration isolation members (Fitting)
260 Bonnet support strut (Fitting)
295 Intermediate bearing (Intermediate support member)

BEST MODE FOR CARRYING OUT THE INVENTION

Figure 2:
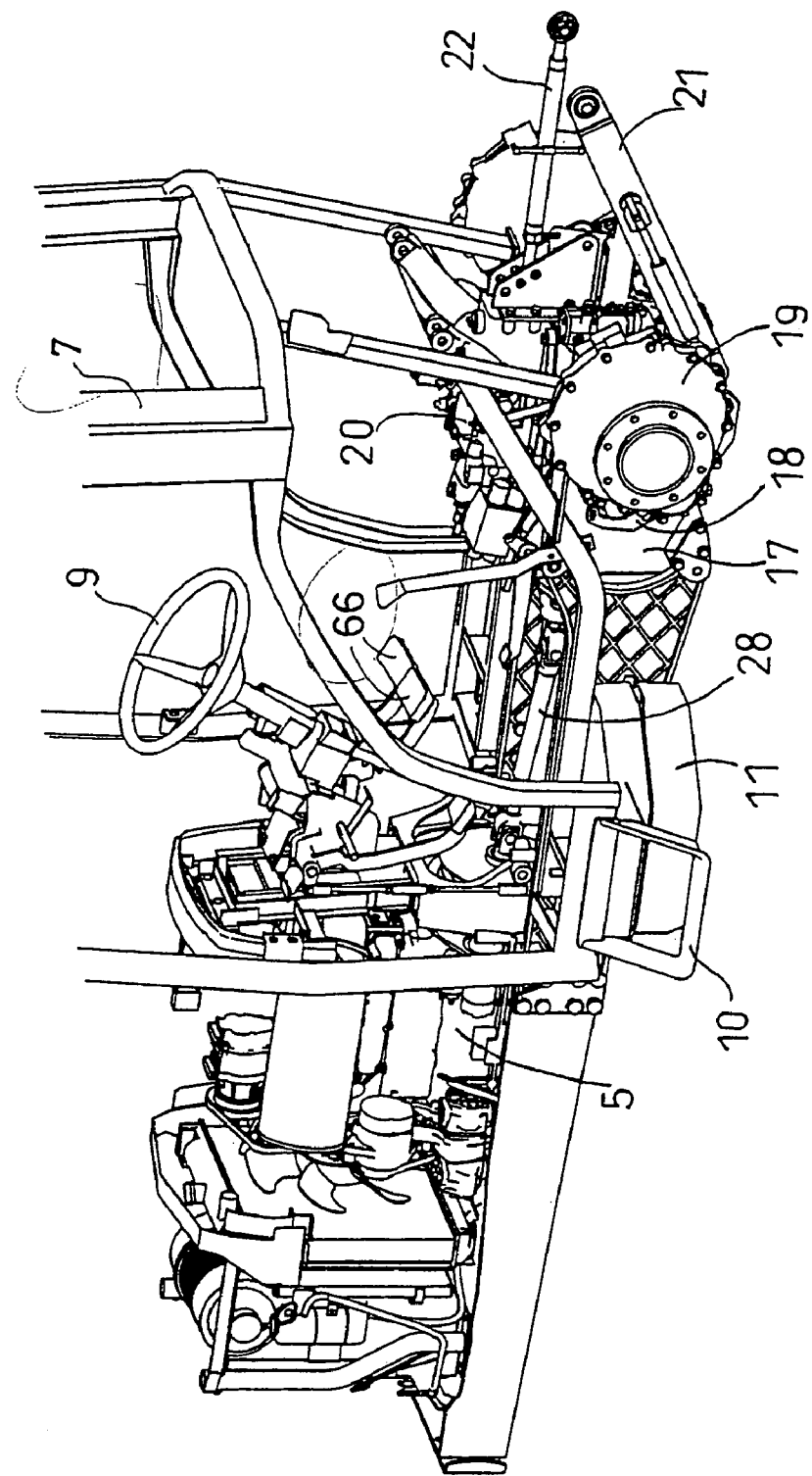
FIG. 2 is a perspective view of the tractor taken from a diagonally rear position.
Figure 3:
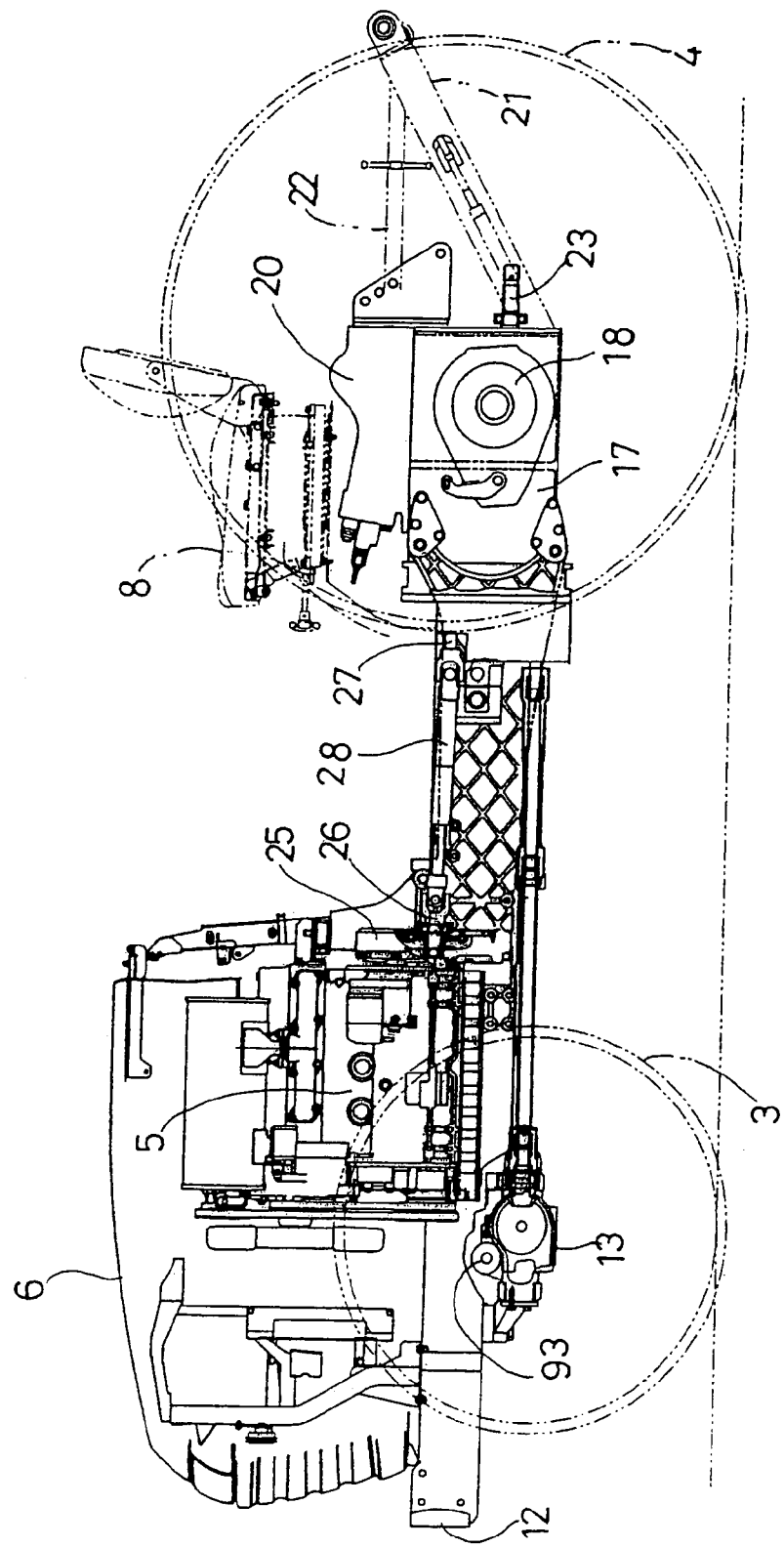
FIG. 3 is an illustrative side view of the tractor.
Figure 4:
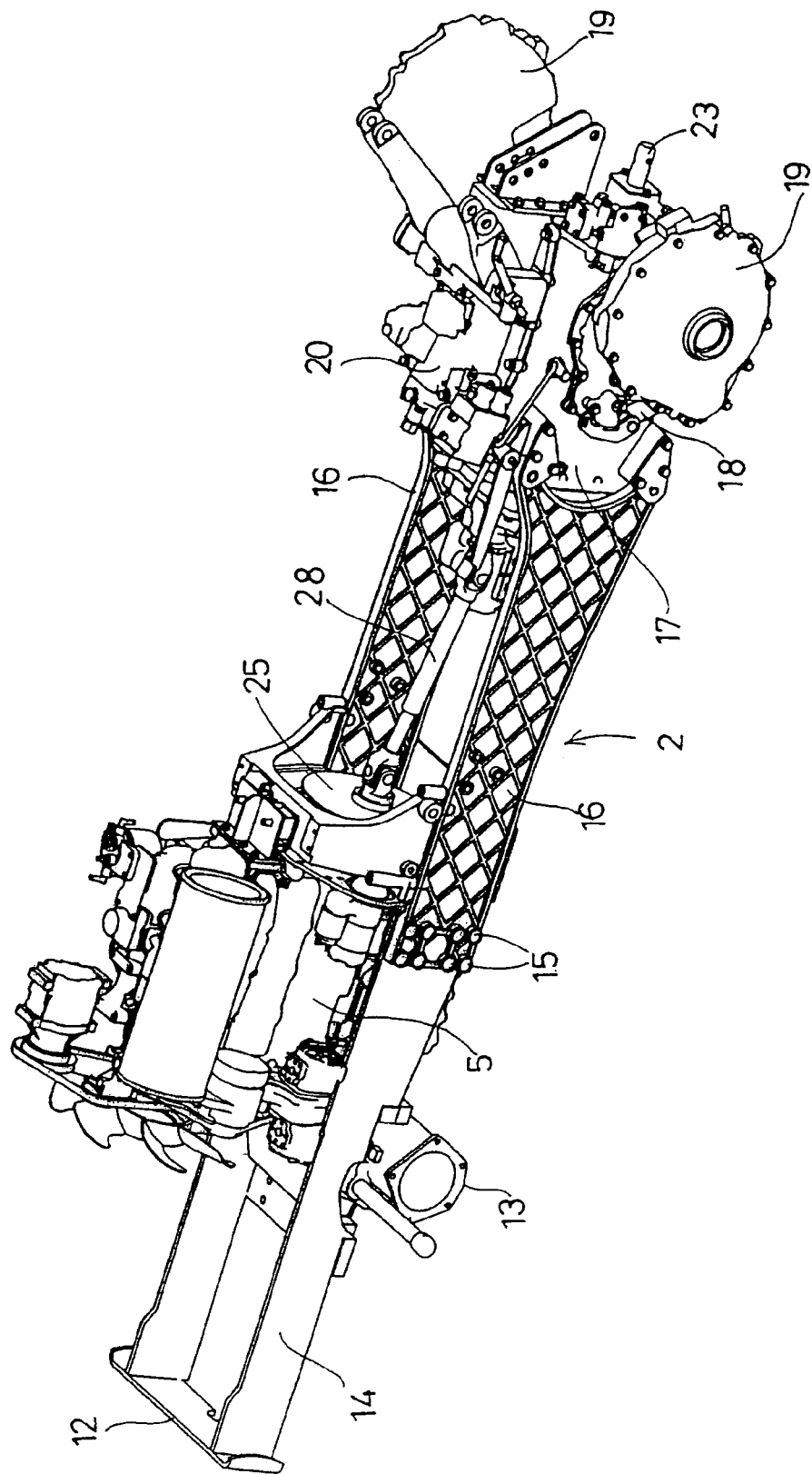
FIG. 4 is a perspective view of the tractor's chassis.
Figure 5:
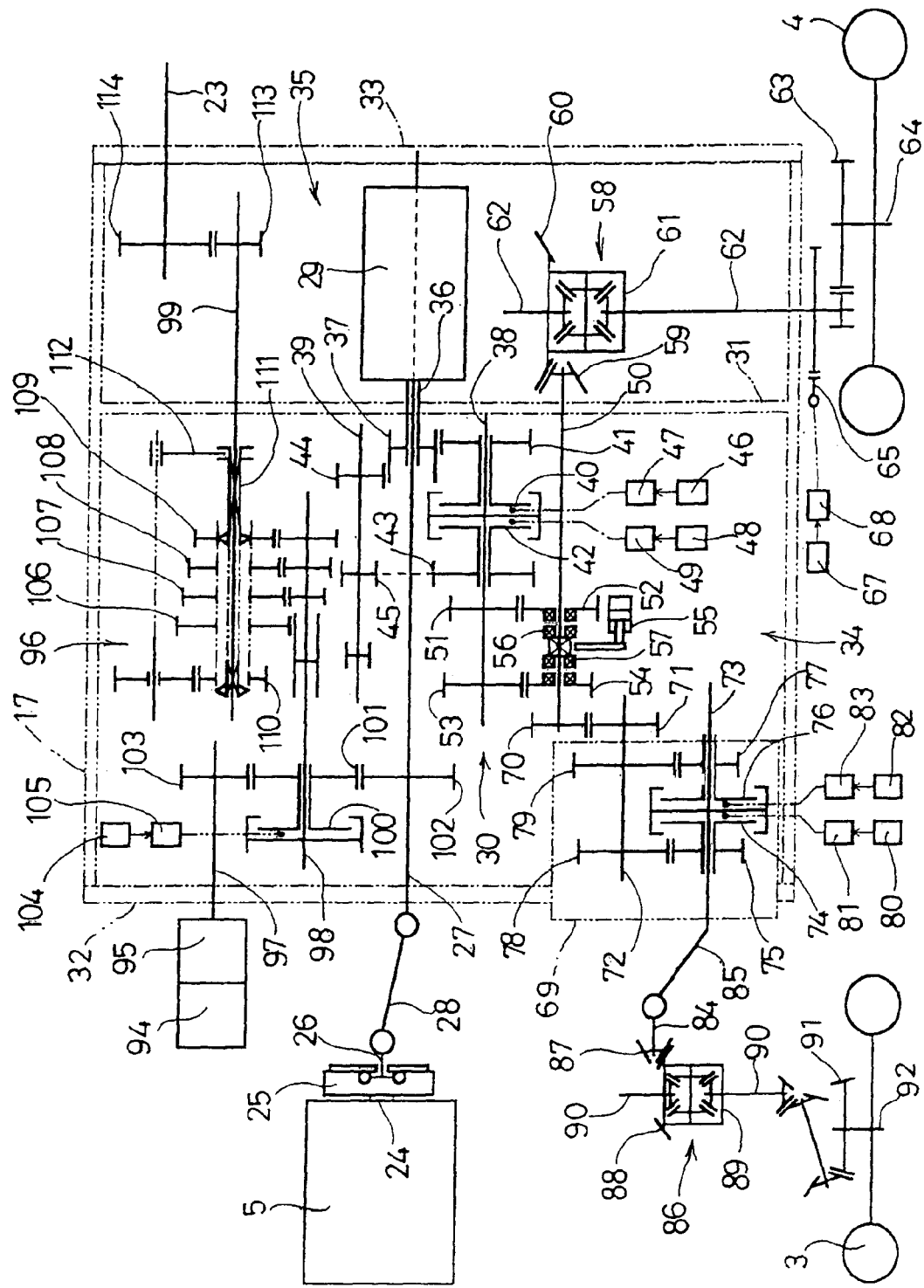
FIG. 5 is a skeleton diagram showing power transmission.

Hereinafter, an embodiment of the present invention will be described with reference to the drawings which illustrate an application of the present invention to an agricultural tractor. FIG. 1 is a side view of the tractor. FIG. 2 is a rear perspective view and FIG. 3 is an illustrative side view thereof. FIG. 4 is a perspective view of the tractor's chassis. FIG. 5 is a skeleton diagram showing power transmission.

As shown in FIGS. 1 through 4, a tractor 1 includes a traction unit chassis 2 supported by a pair of right and left front traveling wheels 3 and a pair of right and left rear traveling wheels 4. An engine 5, which is mounted on a front portion of the traction unit chassis 2, drives the rear wheels 4 and the front wheels 3 so the tractor can make forward and backward movement. The engine 5 is covered by a bonnet 6. A cabin 7 is provided on an upper surface of the traction unit chassis 2. Provided inside the cabin 7 are an operator's seat 8, and a steering wheel 9 for turning the front wheels 3 in the right or left direction. On the side of the cabin 7, a step 10 is provided for the operator to get in and out. More inwardly of the step 10 and lower than the bottom of cabin 7, a fuel tank 11 is provided for supplying fuel to the engine 5.

The traction unit chassis 2 includes: engine frames 14 which have a front bumper 12 and a front axle case 13; and a pair of right and left vehicle frames 16 which are detachably fixed to a rear portion of the engine frames 14 by bolts 15. The vehicle frames 16 have their rear portion connected with a transmission case 17 for appropriate reduction of engine rpm from the engine 5 before being transmitted to the rear wheels 4 and the front wheels 3. In the above construction, the rear wheels 4 are mounted via rear axle cases 18 each attached to an outer side surface of the transmission case 17 in a manner to extend outward from the transmission case 17, and gear cases 19 each attached to an end of outer side surface of the rear axle case 18 in a manner to extend to the rear. The rear portion of the transmission case 17 has an upper surface detachably mounted with a hydraulic lift 20 for lifting/lowering an implement (not illustrated) such as a cultivator. The cultivator and other implements are connected with a rear portion of the transmission case 17 via a lower link 21 and a top link 22. In addition, the transmission case 17 has its rear side surface provided with a PTO shaft 23 to extend in a rearward direction for the cultivator and other implements.

Next, reference will be made to FIG. 10 through FIG. 23, to describe a structure of the rear portion of the traction unit chassis 2 where connection is made between the vehicle frames 16 and the transmission case 17. The right and left pair of vehicle frames 16 are made of an iron alloy or an aluminum alloy for example, and by means of casting. Each vehicle frame 16 has a rear end integrally formed with upper and lower connection bosses 200. As shown in FIG. 18 and FIG. 19, the connection bosses 200 are inserted by a tubular frame pin 201. The frame pin 201 has an end fitted with a pin fastening member 202 or 203 (See FIG. 15). As will be described later, the pin fastening member 203 which is on the right side vehicle frame 16 with respect to the vehicle forward moving direction is integrally formed with a filter lid 221. The frame pin 201 and the pin fastening members 202, 203 are welded together. The vehicle frames are attached to the side surfaces of the transmission case 17 via; tightening bolts 204 each penetrating a hole in the frame pin 201, and fixing bolts 205 each penetrating a mounting hole in the pin fastening members 202, 203.

As shown in FIG. 19, the transmission case 17 has side surfaces formed with a pin insertion hole 206 for pressing the frame pin 201 to fit in. The pin insertion hole 206 has a bottom formed with tightening-bolt hole 207 for the tightening bolts 204 to be threaded in. On the side surface of the transmission case 17 and closely to the pin insertion hole 206, a bolt seat 208 is integrally formed. The bolt seat 208 is formed with fixing-bolt holes 209 for the fixing bolts 205 to be threaded in. A distance L2 between a hole formation surface 210 for the pin insertion hole 206 and a hole formation surface 211 for the fixing-bolt holes 209 is longer than a thickness L1 of the connection boss 200. It should be noted here that the distance L2, which is a length of projection of the bolt seat 208, is formed to be about 1 through 3 millimeters longer than the thickness L1, for example.

The connection boss 200 is formed with a shaft hole 199 for insertion of the frame pin 201. The shaft hole 199 has an inner diameter which is substantially equal to an outer diameter of the frame pin 201 as well as to an inner diameter of the pin insertion hole 206. The frame pin 201 has an end welded to the pin fastening member 202, 203 so that the end surface of the frame pin 201 is substantially flush with the outer side surface of the pin fastening members 202, 203 (See FIG. 19).

Alternatively, the end of the frame pin 201 may be welded to the pin fastening member 202, 203 in such a way that the end surface of the frame pin 201 is slightly higher than the outer side surface of the pin fastening members 202, 203, so that the head of the tightening bolt 204 is pressed onto the end of the frame pin 201 when the tightening bolt 204 is threaded into the tightening-bolt hole 207. Likewise, the method of securing the end of the frame pin 201 to the pin fastening member 202, 203 may not necessarily be welding. For example, the end of the frame pin 201 may be a pressed to fit into the opening of the pin fastening member 202, 203.

As shown in FIG. 18, the frame pin 201 is inserted to penetrate the shaft hole 199 from the outer side of the connection boss 200. Then the frame pin 201 is pressed into the pin insertion hole 206. Each of the bolts 204, 205 is threaded into their corresponding one of the threaded holes 207, 209. This process leaves a gap 212 between the side surface of vehicle frame 16 and the mounting side surface of transmission case 17 (See FIG. 18). Further, the frame pin 201 is supported at its both ends, i.e. by the transmission case 17 and one of the pin fastening members 202, 203. Formation of the gap 212 enables to reduce transmission of mechanical vibration from the vehicle frames 16 to the transmission case 17, and to reduce the amount of machining (e.g. grinding) which must be done to the surface of the transmission case 17 where the vehicle frames 16 are to be attached.

Next, as shown in FIG. 11, FIG. 12, FIG. 15 and FIG. 17, the transmission case 17 incorporates an oil filter 220 for filtration of hydraulic fluid. The oil filter 220 is disposed in a front portion in the transmission case 17, closely to the bottom. The oil filter 220 has a side closely facing the pin fastening member 203. The pin fastening member 203 is formed with a filter lid 221 integrally therewith. The pin fastening member 203 is attached to the transmission case 17, and the filter lid 221 is detachably fixed to the side of the oil filter 220.

The pin fastening member 203 and the filter lid 221 are formed, integrally therewith, with an oil outlet tube 222 which penetrates these members. The outer side surface of the pin fastening member 203 and the inner side surface of the filter lid 221 communicate with each other via the oil outlet tube 222. The oil outlet tube 222 is connected with an oil supply tube 223 for an implement hydrostatic pump 94 and a traction hydrostatic pump 95, via an oil passage tube 224. Hydraulic oil in the transmission case 17 is supplied to the implement hydraulic pump 94 and the traction hydraulic pump 95 via the oil filter 220 (See FIG. 12).

Next, reference will be made to FIG. 10 through FIG. 13, FIG. 20 and FIG. 23 to describe a structure of the engine frames 14. A pair of right-and-left front vibration isolation members 230 are placed on an upper surface side of the right and left engine frames 14, at an intermediate portion between the front and the rear ends of the engine frames. The engine 5 has its right and left front portions connected with respective engine frames 14 via the vibration isolation members 230. A bottom plate frame 231 is placed on a lower surface side of the right and left engine frames 14, at an intermediate portion between the front and the rear ends of the engine frames. The bottom plate frame 231 has a lower surface side provided with the front axle case 13 and a power-steering hydraulic cylinder 93. On the right and the left sides of the front axle case 13, the right and the left front wheels 3 are set in a steerable manner.

Next, reference will be made to FIG. 10, FIG. 13 through FIG. 16, FIG. 21 and FIG. 24 to describe a front structure of the vehicle frames 16 which are connected with the engine frames 14. At front portions of the right and left vehicle frames 16, there are disposed an upper connecting member 250 which looks like a gate in a front view, and a lower connecting member 251 which has a platy shape. The upper connecting member 250 has both of its gate leg ends fastened with bolts 252, to respective upper surfaces of the vehicle frames 16. The lower connecting member 251 has its two ends fastened with bolts 253, to respective lower surfaces of the vehicle frames 16. A flywheel 25 is placed between the right and left vehicle frames 16. Above the flywheel 25 is the upper connecting member 250. Therefore, below the flywheel 25 is the lower connecting member 251. The right and left vehicle frames 16 and the upper and lower connecting members 250, 251 make an enclosure around the circumference (right and left sides, upper and lower sides) of the flywheel 25.

Next, description will cover a connecting operation or how the vehicle frames 16 and the transmission case 17 are connected with each other. A frame pin 201 is inserted through a shaft hole 199 whereby a connection boss 200 is inserted around the frame pin 201. The tip portion of the frame pin 201 is pressed into a pin insertion hole 206. Then, from an outer side of a pin fastening member 202, 203, a tightening bolt 204 is threaded into a tightening-bolt hole 207, whereby the frame pin 201 is pressed and fastened into the pin insertion hole 206. Bolts 204, 205 are threaded into their respective holes 207, 209, whereby the gap 212 is formed between the side surface of the vehicle frame 16 and the side mounting surface of the transmission case 17. The frame pin 201 is now supported at its both ends, i.e. by the transmission case 17 and the pin fastening member 202, 203, completing the connection between the rear portion of the vehicle frame 16 and the side surface of the transmission case 17 (See FIG. 18).

After connecting the rear of the right and left vehicle frames 16 with the side surfaces of the transmission case 17, front portions of the vehicle frames 16 are fastened with bolts 15, to the outer side surfaces in the rear portion of the engine frames 14. Two foot portions of the upper connecting member 250 are fastened with bolts 252, to respective upper surfaces in a front portion of the right and left vehicle frames 16. Two lateral ends of the lower connecting member 251 are fastened with bolts 253, to respective lower surfaces in a front portion of the right and left vehicle frames 16: The front portion of the right and left vehicle frames 16 are now connected with each other on their upper and the lower surfaces, via the upper and the lower connecting members 250, 251, completing an assembly of the traction unit chassis 2 (See FIG. 15).

Next, description will cover a time of a maintenance operation for example, of the hydraulic pumps 94, 95 which are provided on the front side of the transmission case 17, or other occasions when components on the front side of the transmission case 17 must be removed. Each of the bolts 204, 205 is removed so that the pin fastening members 202, 203 are removed from the respective side surfaces of the vehicle frames 16 and transmission case 17, and the rear portions of the vehicle frames 16 are separated from respective side surfaces of the transmission case 17. On the other hand, by removing the bolts 15, 252, 253, the front portions of the vehicle frames 16 are separated from the engine frames 14 and from the upper and the lower connecting members 250, 251. One or both of the right and left vehicle frames 16 are removed for performing operations such as a maintenance work on the hydraulic pumps 94, 95.

Next, when replacing the oil filter 220, for example, which is placed inside the transmission case 17, the pin fastening member 203 which is formed with the filter lid 221 is removed from the right vehicle frame 16 and the right side surface of the transmission case 17 by threading the bolts 205 out. When the filter lid 221 is removed from the transmission case 17, an old dirty oil filter 220 is removed from inside the transmission case 17. A new oil filter 220 is placed inside the transmission case 17, and thereafter, the pin fastening member 203 is fastened with the bolts 205, to the right vehicle frame 16 and the right side surface of the transmission case 17, completing the replacement of the oil filter 220 in the transmission case 17.

As is clear from the above description and FIG. 18, etc., the working vehicle includes engine frames 14 for mounting an engine 5, and a pair of right and left vehicle frames 16, with rear portions of the engine frame connected with front portions of the vehicle frames, and a transmission case 17 being placed between rear portions of the right and left vehicle frames 16. With these arrangements, rear portions of the vehicle frames 16 are extended to side surfaces of the transmission case 17, the rear portions of the vehicle frames 16 are penetrated by frame pins 201 from an outer side of the vehicle frame, and the frame pins 201 have a tip portion fitted into the side surface of the transmission case 17. This enables to reduce e.g. the area of the side surface on the transmission case 17 necessary for connecting the vehicle frames 16, as compared to conventional bolt connection, leading a way to use the side surfaces of the transmission case 17 as a space for providing a speed shift operation mechanism for example. Since the vehicle frames 16 and the transmission case 17 are connected with each other via the frame pins 201, the vehicle frames 16 can now be made at a low cost, through a casting process for example, using inexpensive material and production processes which are not very much limiting on the shape design. Thus, it becomes possible to simplify or reduce the weight of the traction unit chassis in the tractor 1 for example, and thereby to reduce manufacturing cost.

Figure 25:
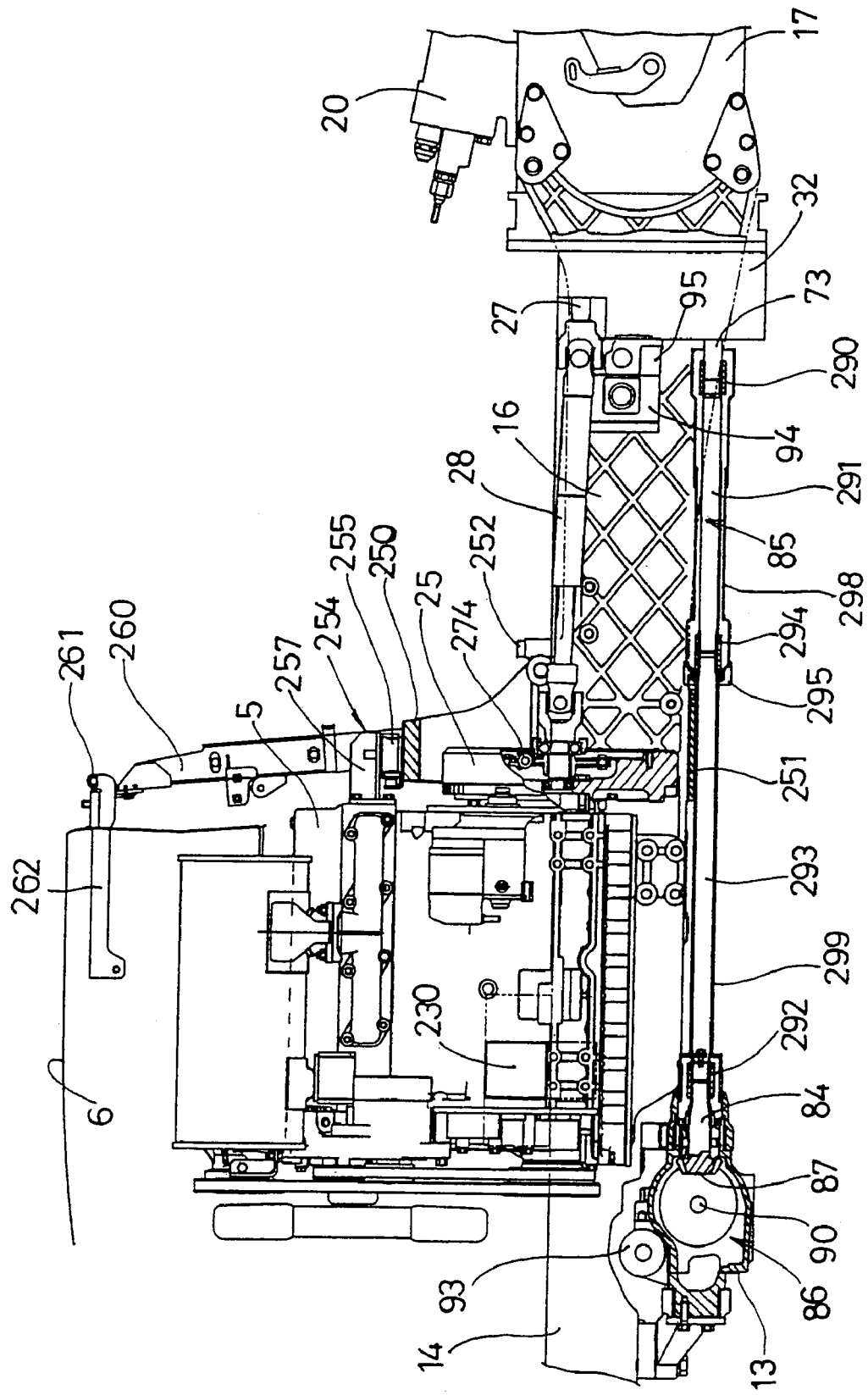
FIG. 25 is an illustrative side view of the engine and a bonnet section.

As is clear from the above description and FIG. 25, etc., the flywheel 25 is provided at a rear of the engine 5; and the flywheel 25 is between the right and the left vehicle frames 16. This enables to enclose the right and the left sides around the flywheel 25 with the right and the left vehicle frames 16, i.e. to use the right and the left vehicle frames 16 as protective members of the flywheel 25. Thus, it becomes possible to simplify or reduce the weight of the traction unit chassis in the tractor 1 for example, and thereby to reduce manufacturing cost.

Figure 20:
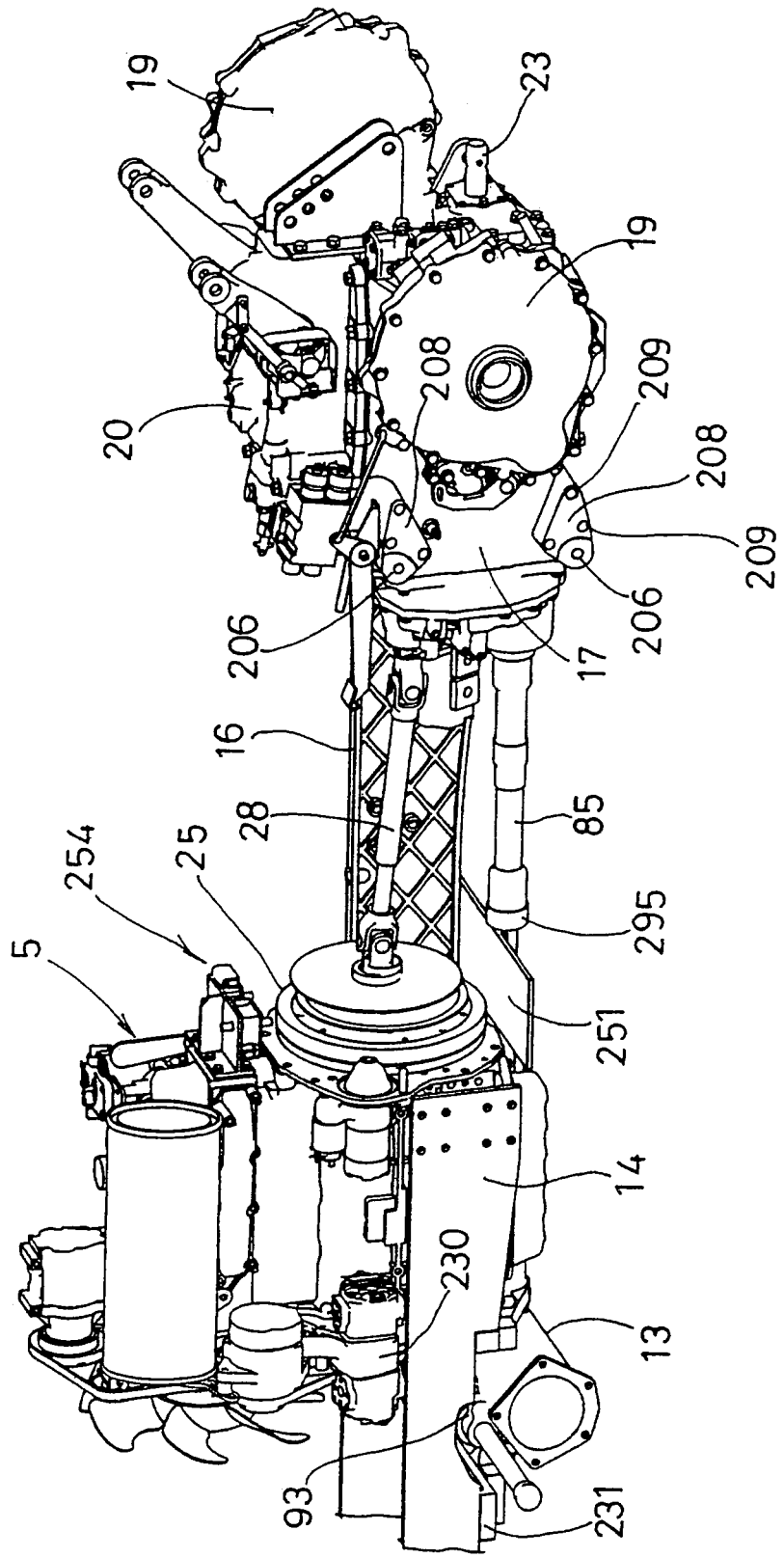
FIG. 20 is a left-rear perspective view, with the left vehicle frame removed.
Figure 21:
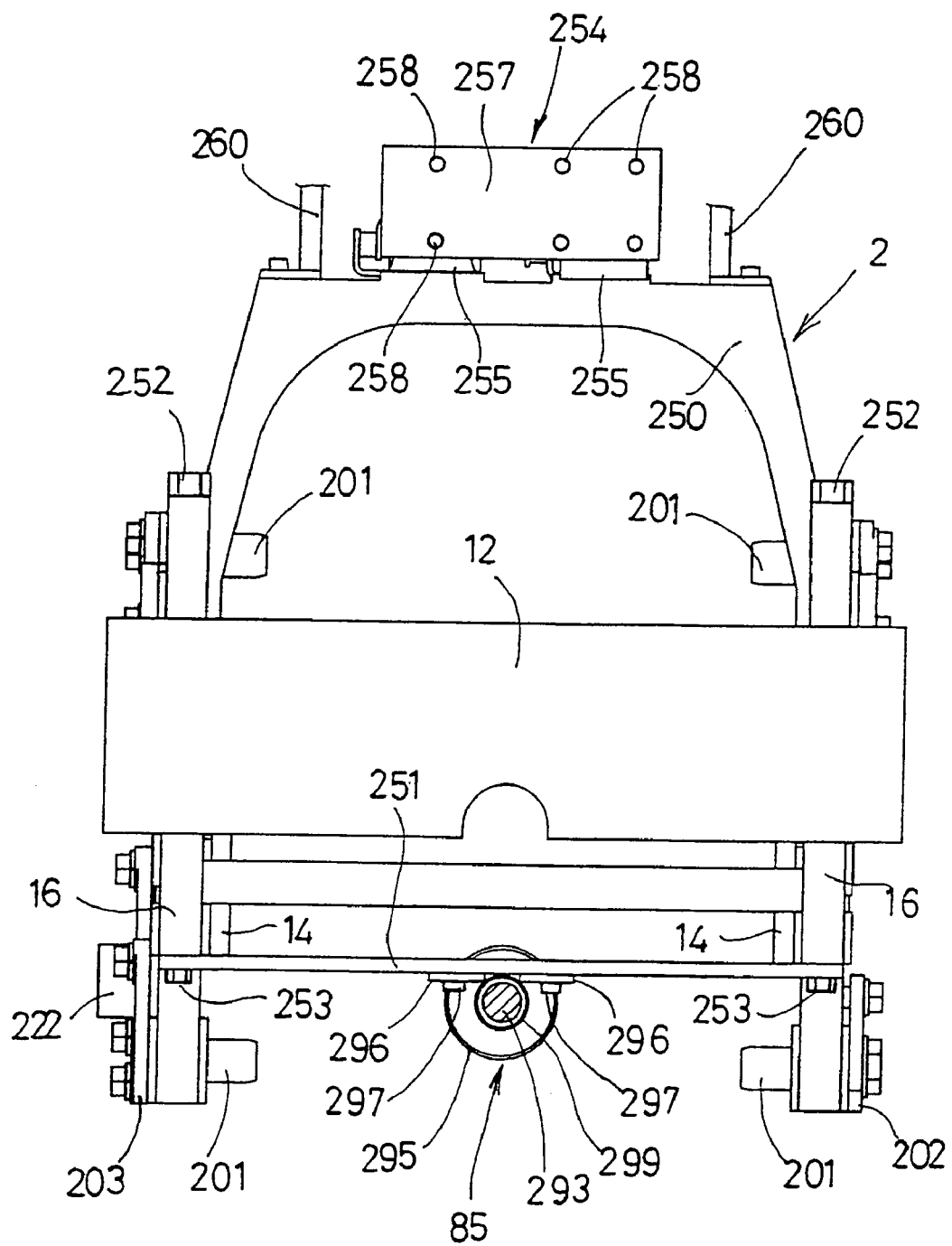
FIG. 21 is a front view of the traction unit chassis.
Figure 22:
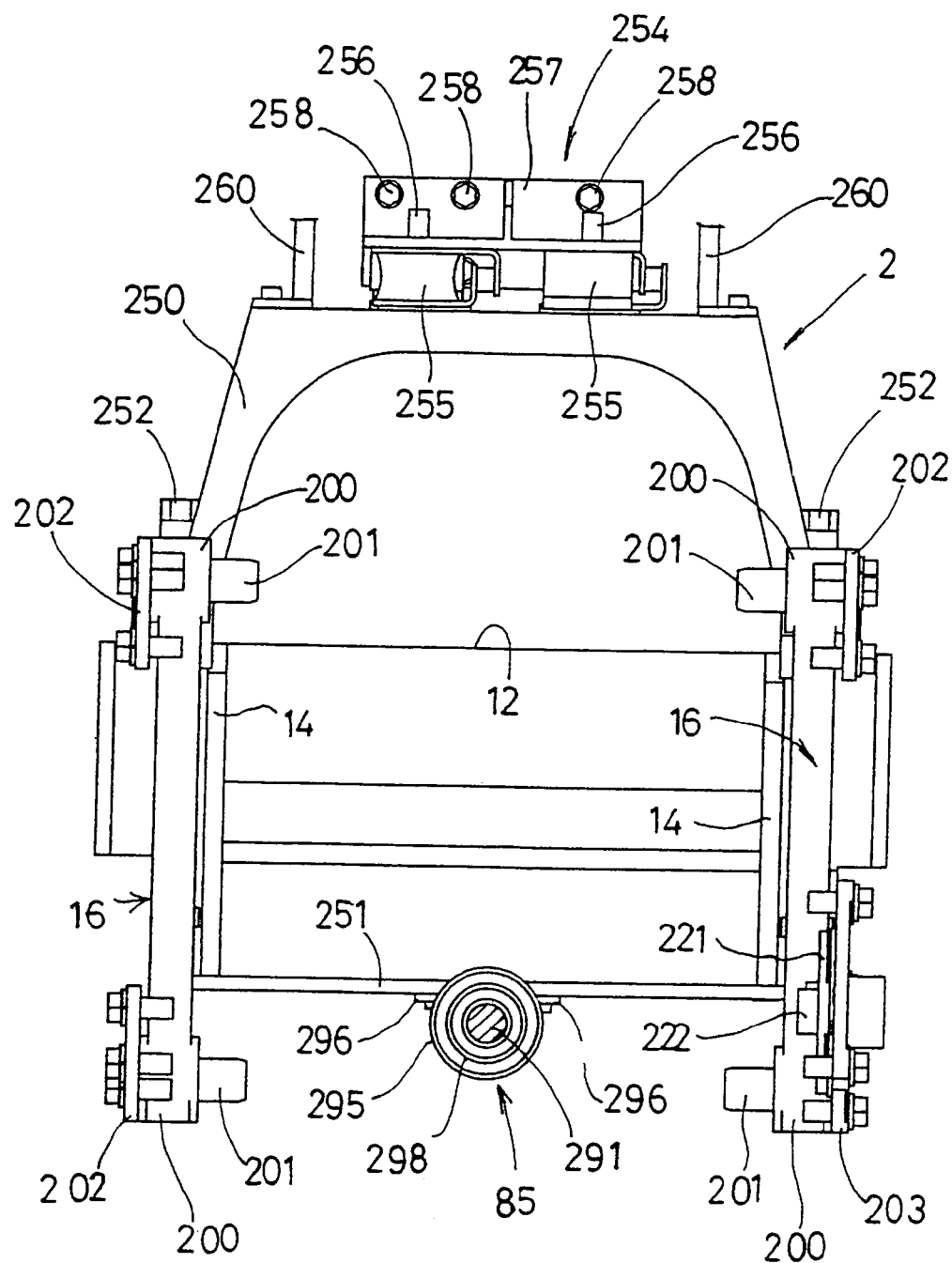
FIG. 22 is a rear view of the traction unit chassis.

As is clear from the above description and FIG. 20, etc., it is possible to remove one of the right and the left vehicle frames 16 from the engine frame 14 and the transmission case 17 while the other of the vehicle frames 16 is connected with the engine frame 14 and the transmission case 17. This allows the engine frames 14 and the right and the left vehicle frames 16 to be machined and assembled separately from each other as three independent kinds of components. Thus, it becomes possible to increase ease of handling of the traction unit chassis 2, as compared to conventional construction in which the engine frames 14 is integrally connected with the right and left vehicle frames 16 for example.

Figure 17:
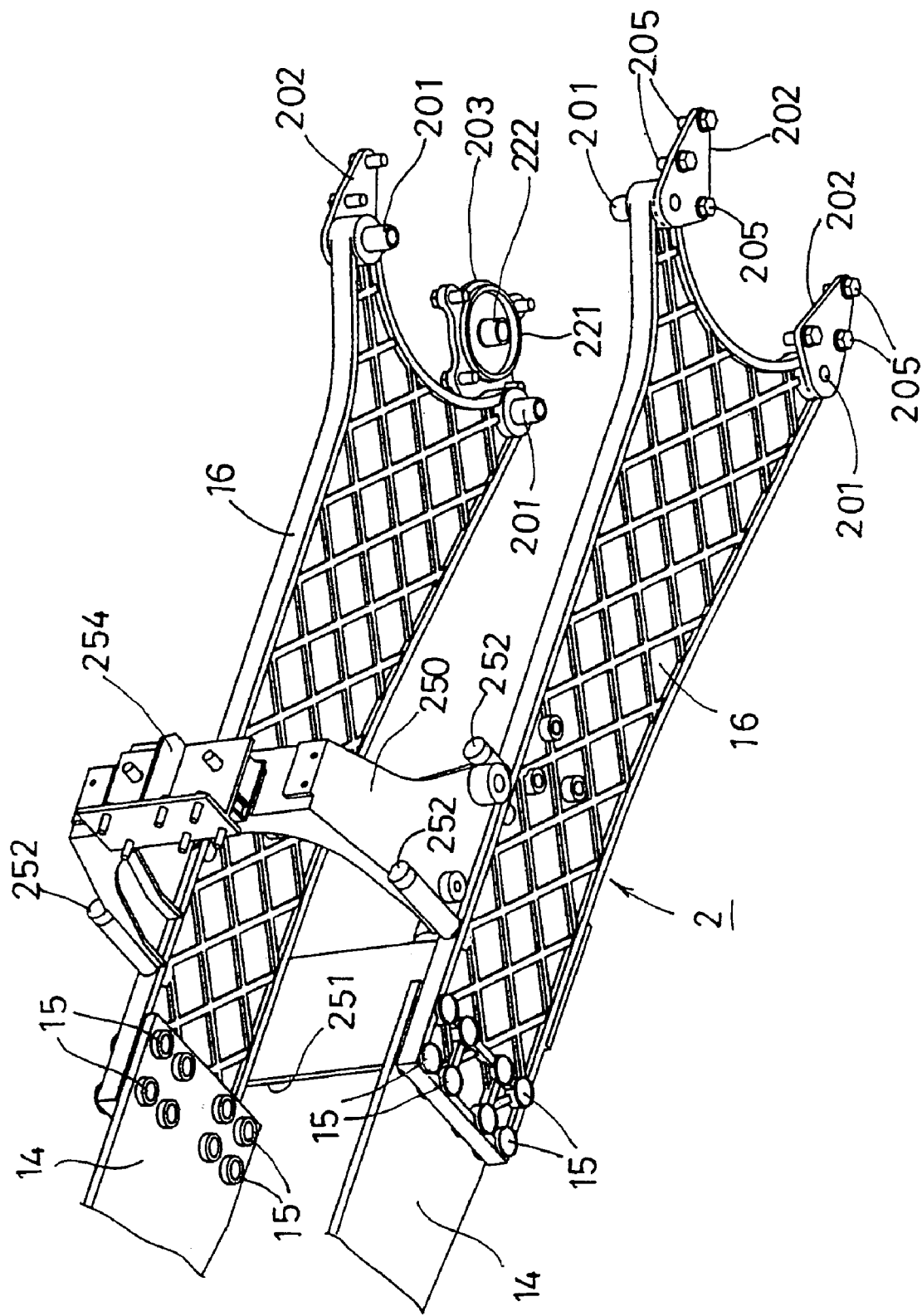
FIG. 17 is a left-front perspective view of the vehicle frame.
Figure 18:
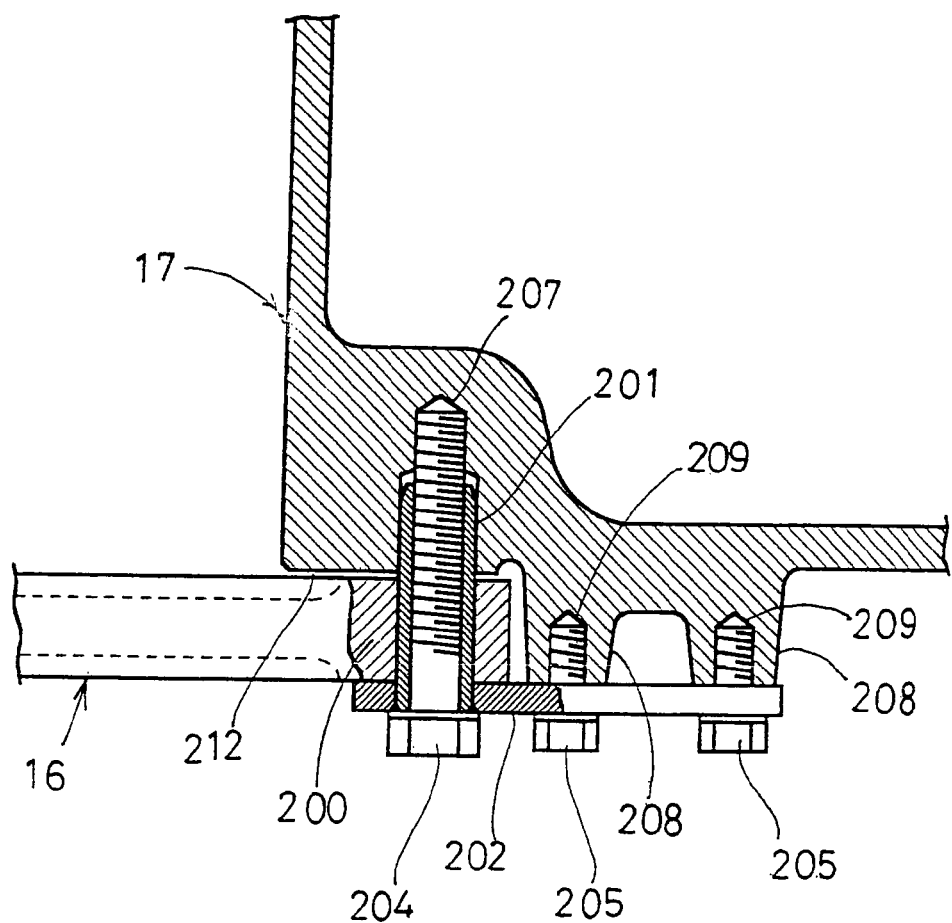
FIG. 18 is an enlarged view of a portion where the vehicle frame is connected with the transmission case.
Figure 19:
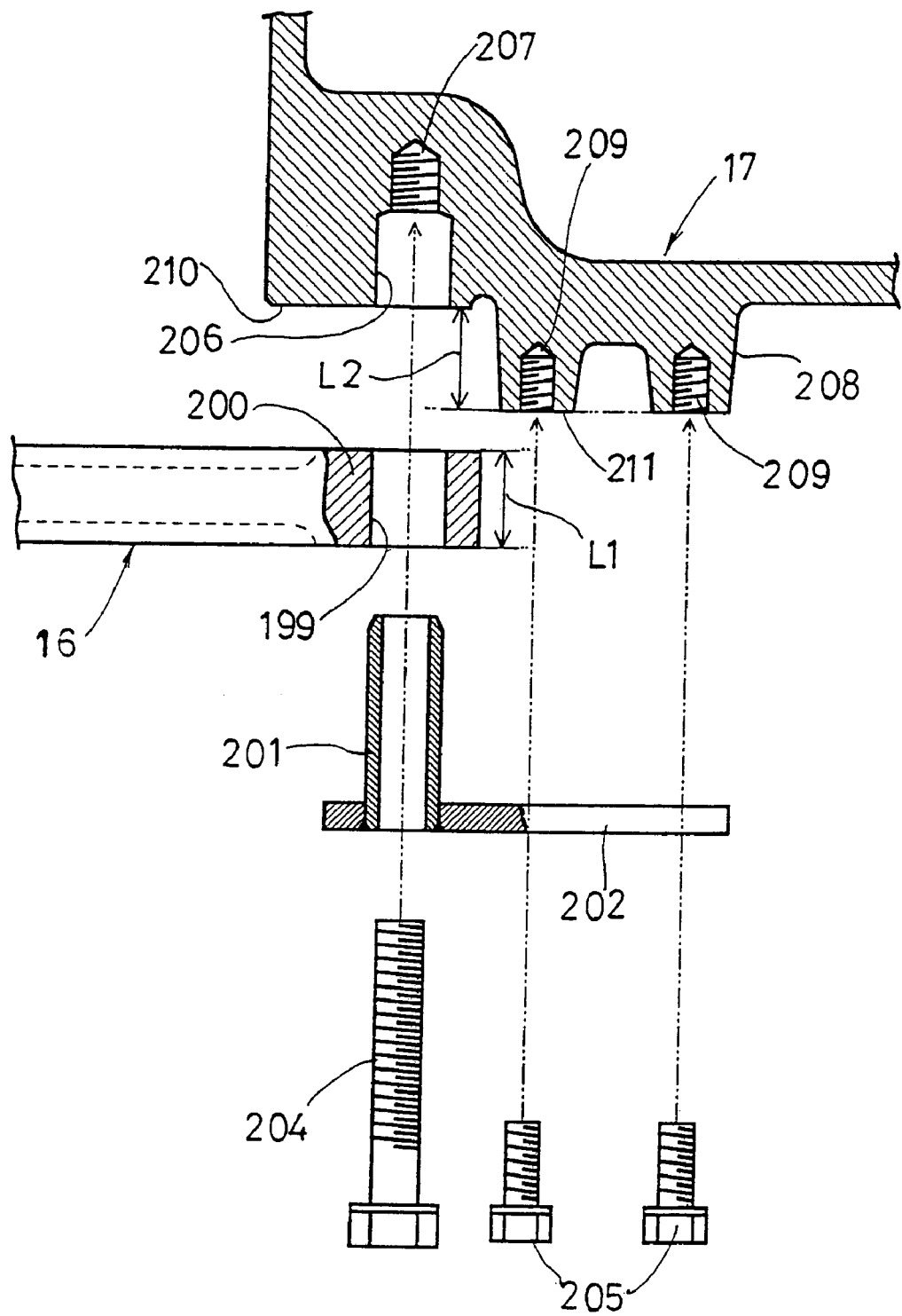
FIG. 19 is an exploded view of the portion where the vehicle frame is connected with the transmission case.

As is clear from the above description and FIG. 17, FIG. 18, etc., the working vehicle includes engine frames 14 for mounting an engine 5, and a pair of right and left vehicle frames 16, with rear portions of the engine frames connected with front portions of the vehicle frames, and a transmission case 17 being placed between rear portions of the right and left vehicle frames 16. With these arrangements, rear portions of the vehicle frames 16 are extended to side surfaces of the transmission case 17, the rear portions of the vehicle frames 16 are penetrated by frame pins 201 from an outer side of the vehicle frame, the frame pins 201 have a tip portion fitted into the side surface of the transmission case 17, the frame pins 201 have a base portion provided with a pin fastening member 202, 203, and the pin fastening member 202, 203 is fastened to an outside surface of the transmission case 17. This enables to support the vehicle frame 16 at an intermediate portion of the frame pin 201 in a dual-end supporting structure in which the frame pin 201 is supported on its both ends by the transmission case 17 and the pin fastening member 202, 203, and therefore to provide sufficient connection strength between the vehicle frame 16 and the transmission case 17. Thus, it becomes possible to reduce manufacturing cost of the chassis of the tractor 1 or the transmission case 17 for example, as compared to the conventional structure of bolting the vehicle frames 16 to the transmission case 17.

As is clear from the above description and FIG. 18, etc., a tightening bolt 204 is inserted through the frame pin 201 from an outer side of the pin fastening member 202, 203, and the tightening bolt 204 is threaded into the transmission case 17. This means that the connection between the vehicle frame 16 and the transmission case 17 is accomplished by dual shafts provided by the frame pin 201 and the tightening bolt 204, enabling to improve connection rigidity between the vehicle frame 16 and the transmission case 17.

Figure 12:
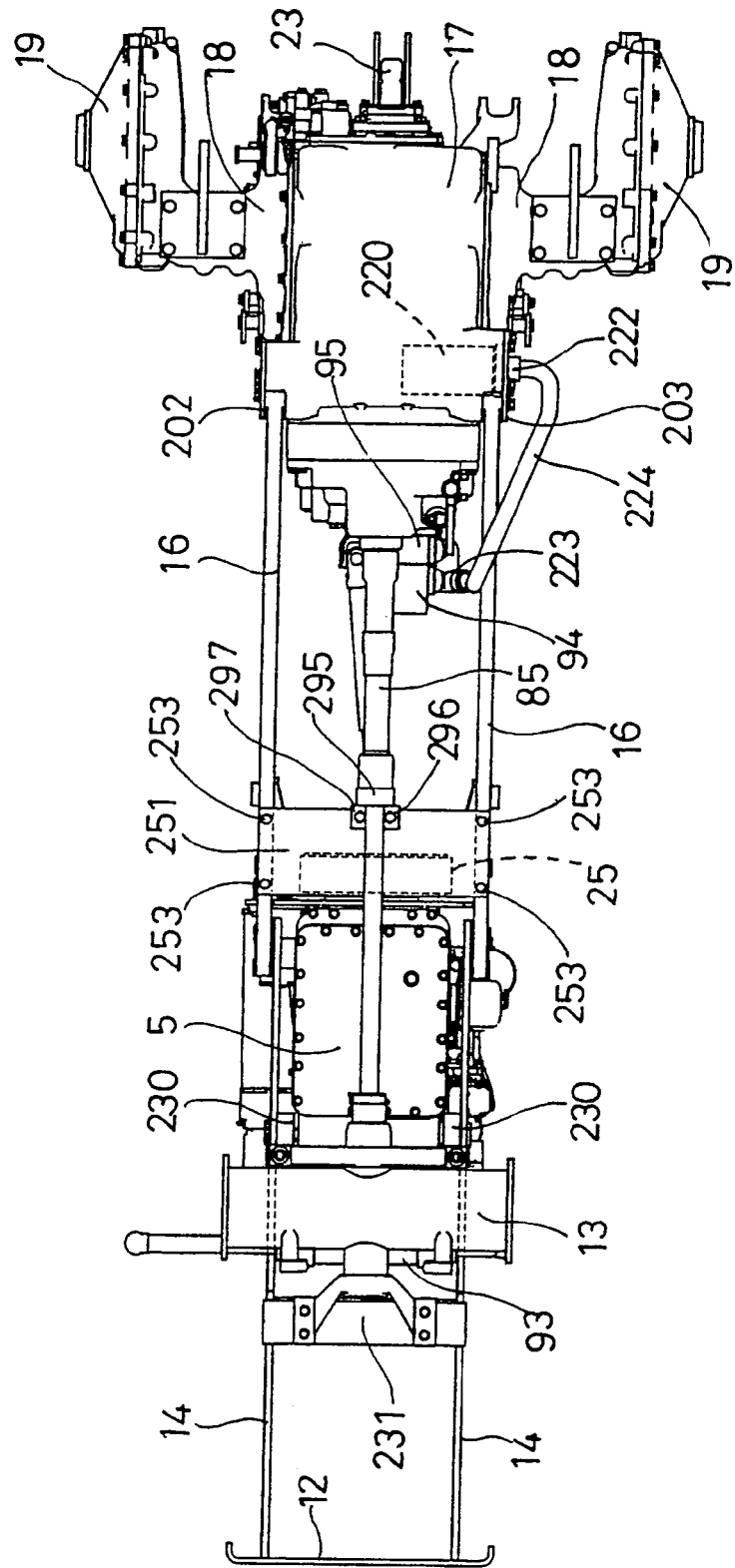
FIG. 12 is a bottom view of the traction unit chassis, the engine and the transmission case.
Figure 13:
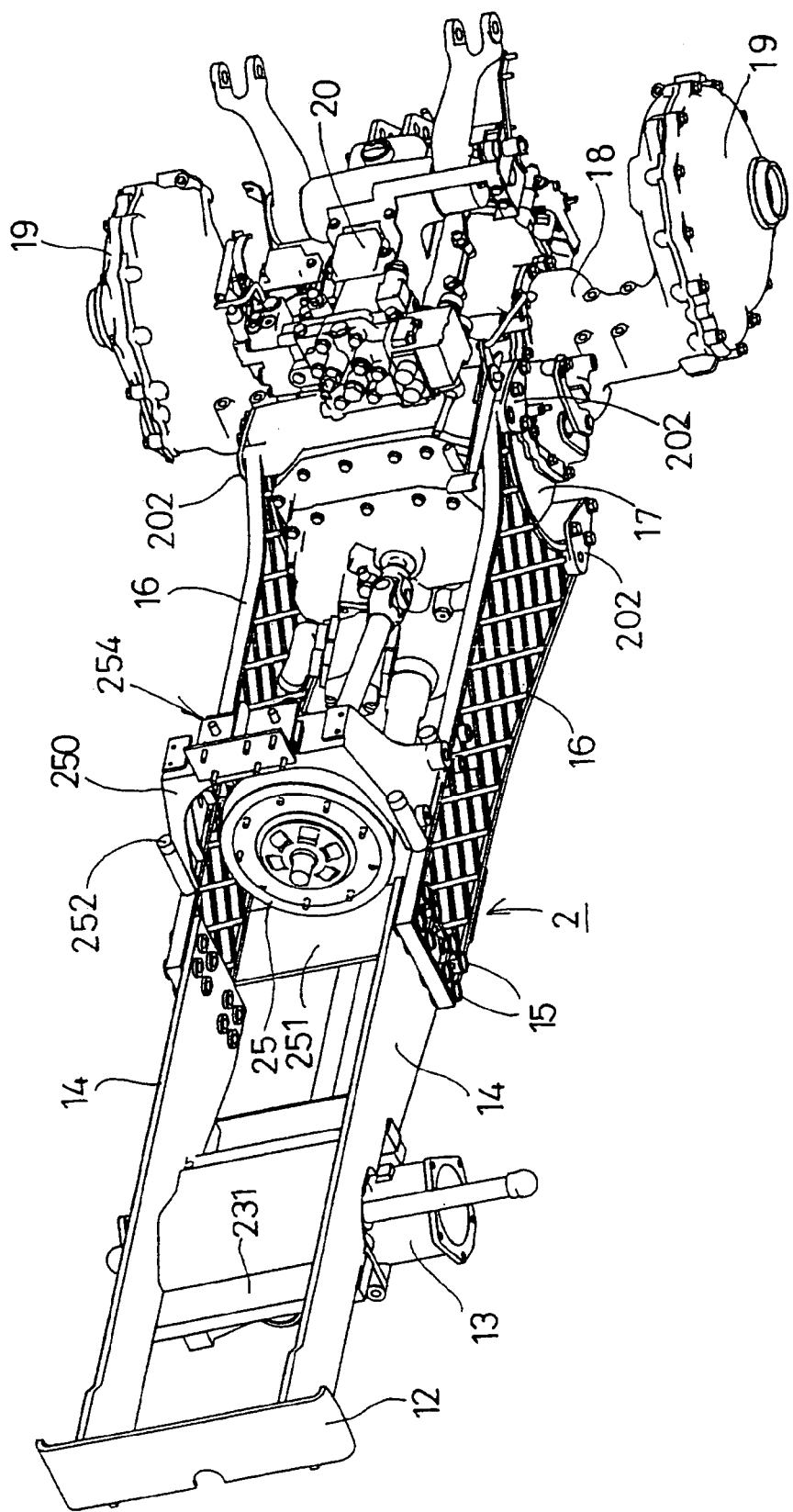
FIG. 13 is a left-front perspective view of the traction unit chassis and the transmission case.
Figure 14:
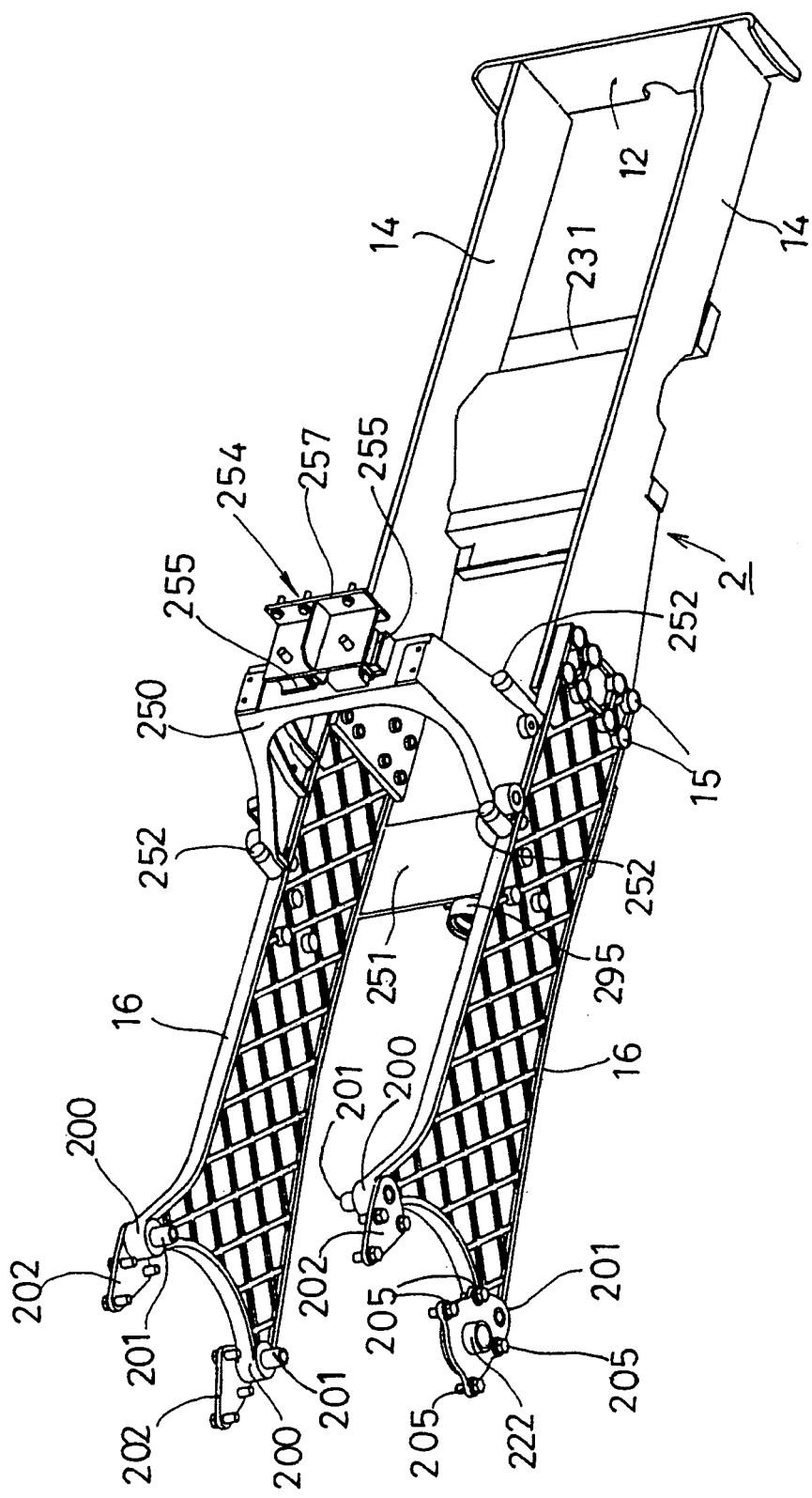
FIG. 14 is a right-rear perspective view of the traction unit chassis.
Figure 15:
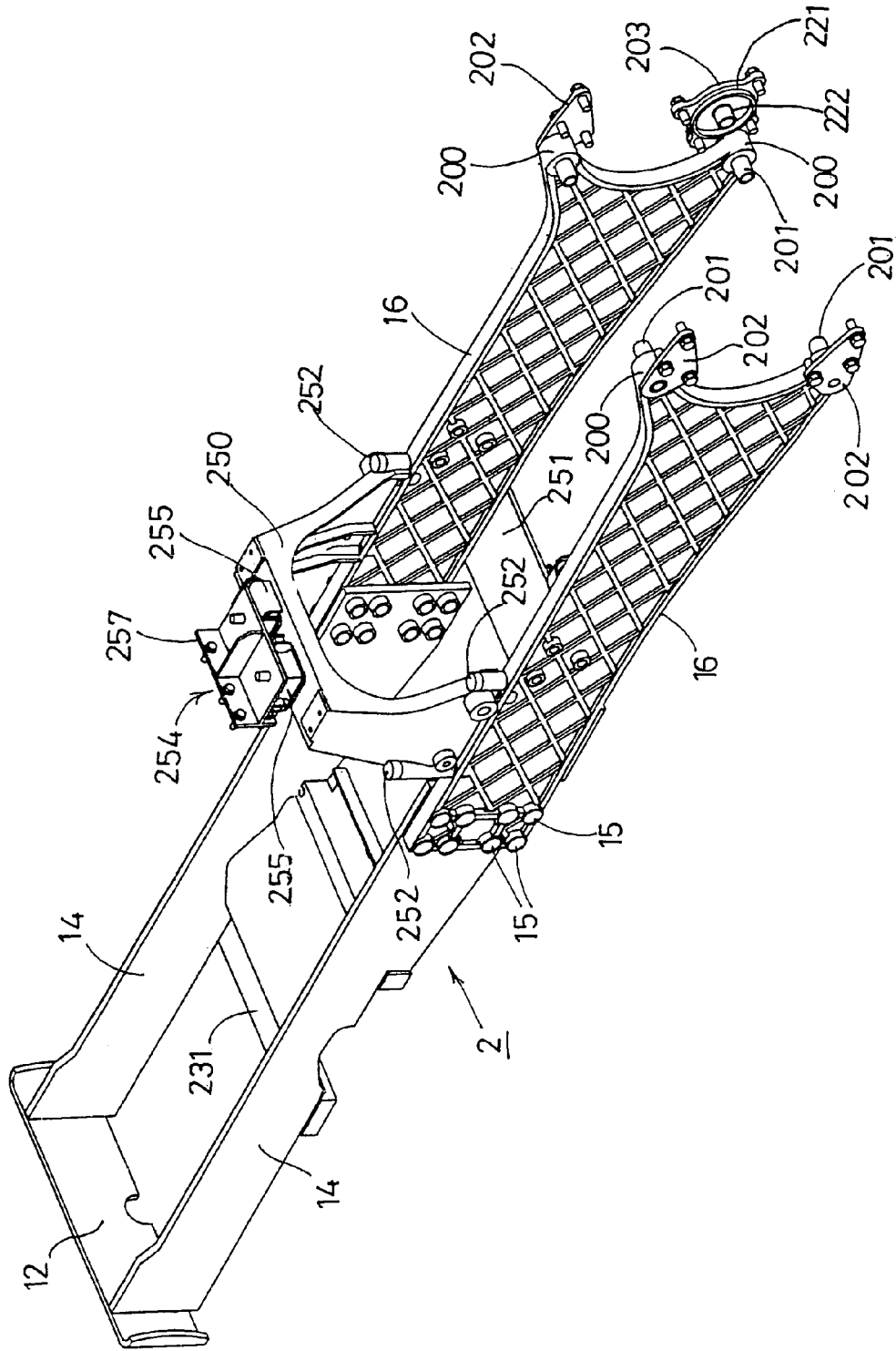
FIG. 15 is a left-rear perspective view of the traction unit chassis.
Figure 16:
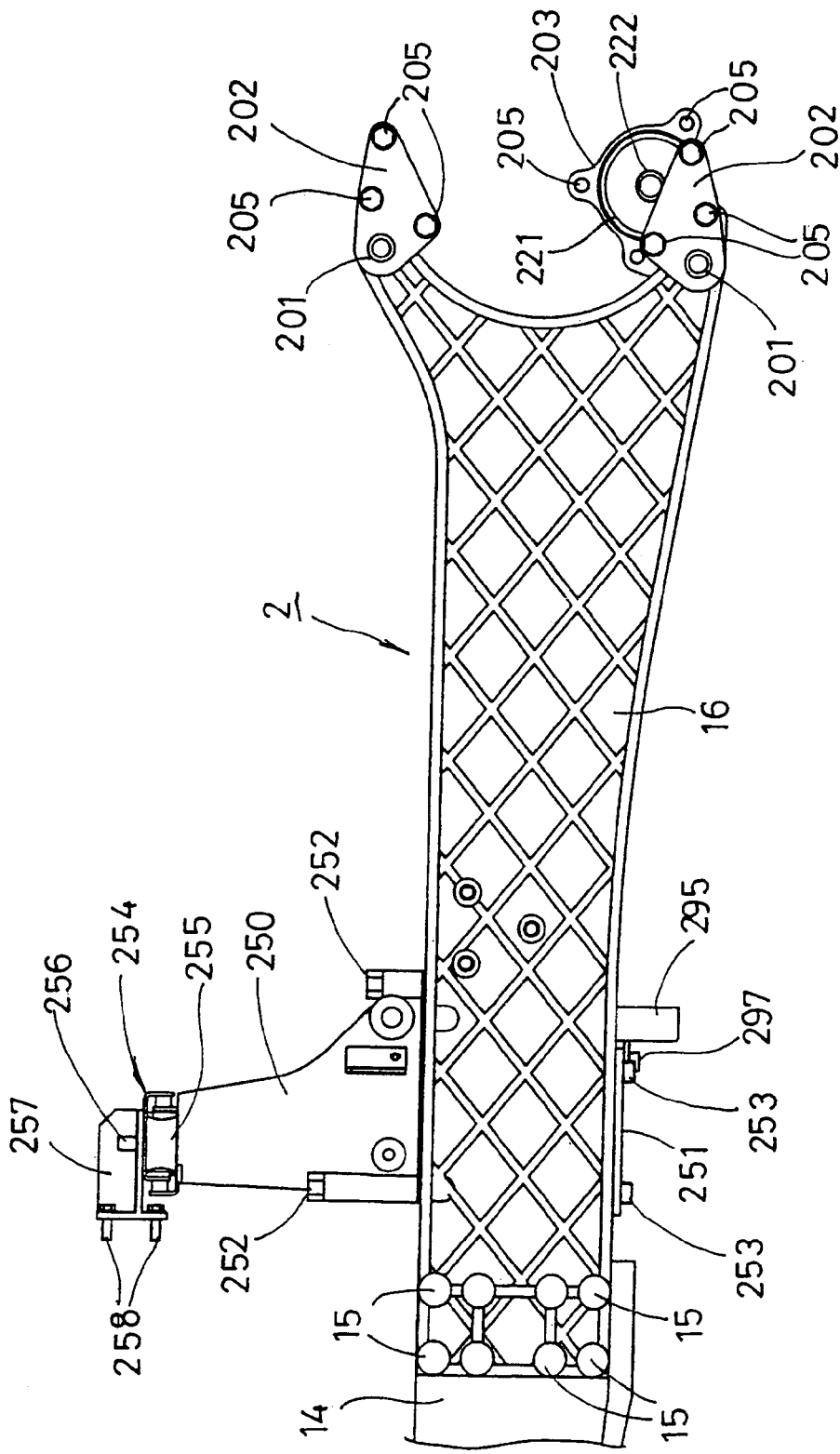
FIG. 16 is a side view of a vehicle frame.

As is clear from the above description and FIG. 12, FIG. 15, etc., a filter lid 221, which is to be attached to the oil filter 220 inside the transmission case 17, is formed on at least one of the pin fastening members 203. This allows removing of the oil filter 220 by removing the pin fastening member 203 from the outer side surface of the transmission case 17, enabling to improve ease of maintenance of the oil filter 220.

As is clear from the above description and FIG. 18, etc., a gap 212 is formed between a side surface of the transmission case 17 and an opposing side surface of the vehicle frames 16. This reduces machining (such as finishing performed after a casting process) to the vehicle frame 16 and the transmission case 17, as compared to the conventional bolt fastening structure in which a side surface of the vehicle frame 16 is pressed to a side surface of the transmission case 17. Further, this also enables to reduce transmission of vibration from e.g. the engine 5 to the transmission case 17.

Next, as shown in FIG. 22 through FIG. 25, rear vibration isolation members 254 are provided on an upper surface of the upper connecting member 250, in an intermediate portion of a right-to-left width thereof. The rear vibration isolation members 254 include right and left vibration separation rubbers 255 fastened on the upper surface of the upper connecting member 250 with bolts 256, and pressure bearing frames 257 which connect the vibration separation rubbers 255 with each other. The pressure bearing frames 257 are fastened to an upper portion of the back surface of the engine 5 with bolts 258. The upper portion of the back surface of engine 5 and the upper surface of the upper connecting member 250 are connected with each other by the rear vibration isolation members 254.

Figure 23:
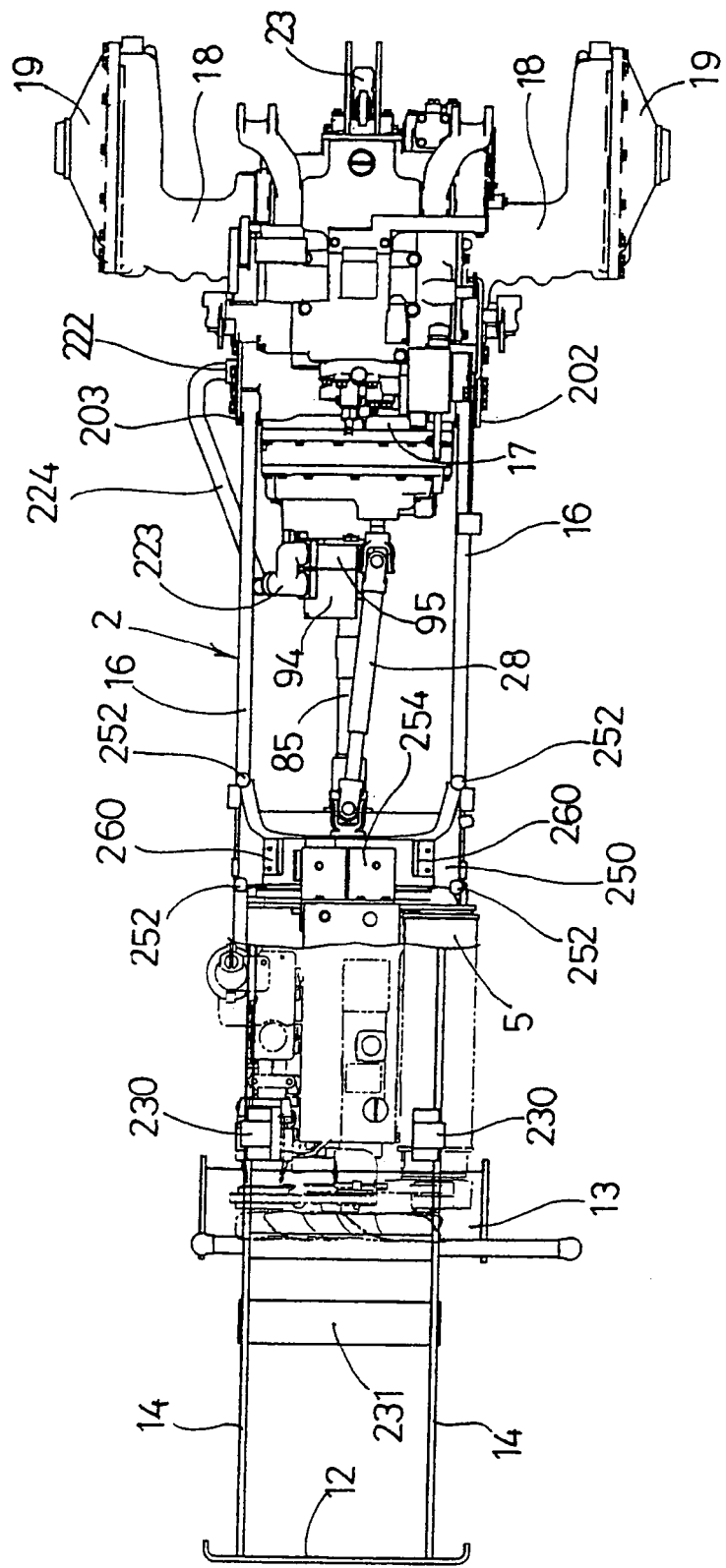
FIG. 23 is an illustrative plan view of an engine vibration isolation structure.

As shown in FIG. 23 and FIG. 25, the right and left front vibration isolation members 230 and the rear vibration isolation members 254 are placed in a triangular pattern as viewed in a plan view, on the apexes of the triangle (with the center of gravity of the engine 5 being approximately at the center of the triangle in a plan view) (See FIG. 23). The front vibration isolation members 230 and the rear vibration isolation members 254 are placed on a line which is substantially parallel to a diagonal line of a rectangle that represents a side view projection of the engine 5 (a line which passes through the center of gravity of the engine 5 in a side view) (See FIG. 25). As shown in FIG. 21, FIG. 22, FIG. 23 and FIG. 25, right and left bonnet support struts 260 are erected respectively on right and left ends of an upper surface of the upper connecting member 250. The right and left bonnet support struts 260 are placed so as to sandwich the rear vibration isolation members 254, i.e. on the right and left sides thereof. The bonnet support struts 260 have their upper ends connected with a bonnet support frame 262 via a bonnet mounting shaft 261. The bonnet 6 is welded to the bonnet support frame 262. The bonnet 6 can pivot open and close, around the bonnet mounting shaft 261.

Figure 24:
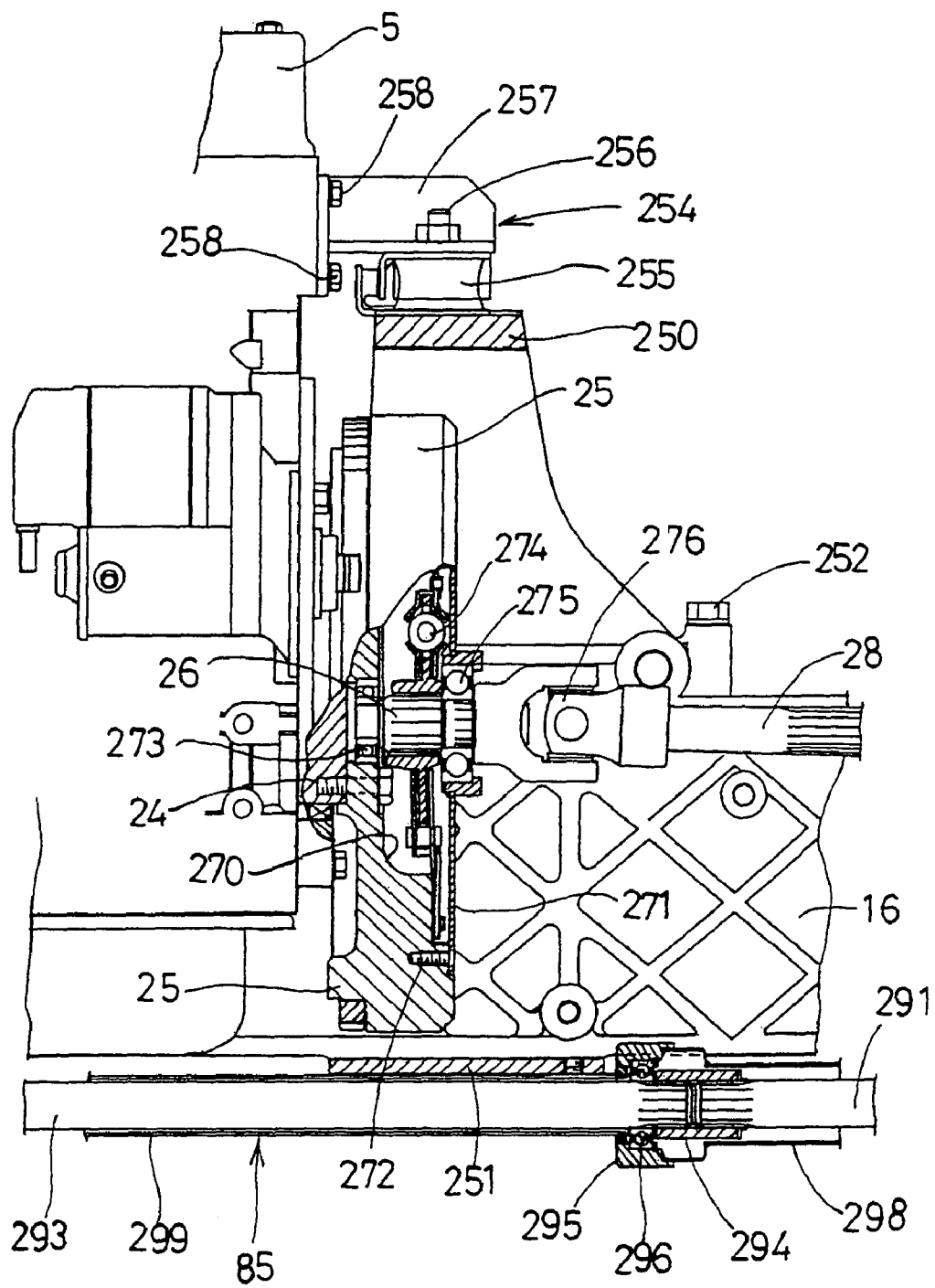
FIG. 24 is an illustrative side view of a flywheel section of the engine.
Figure 26:
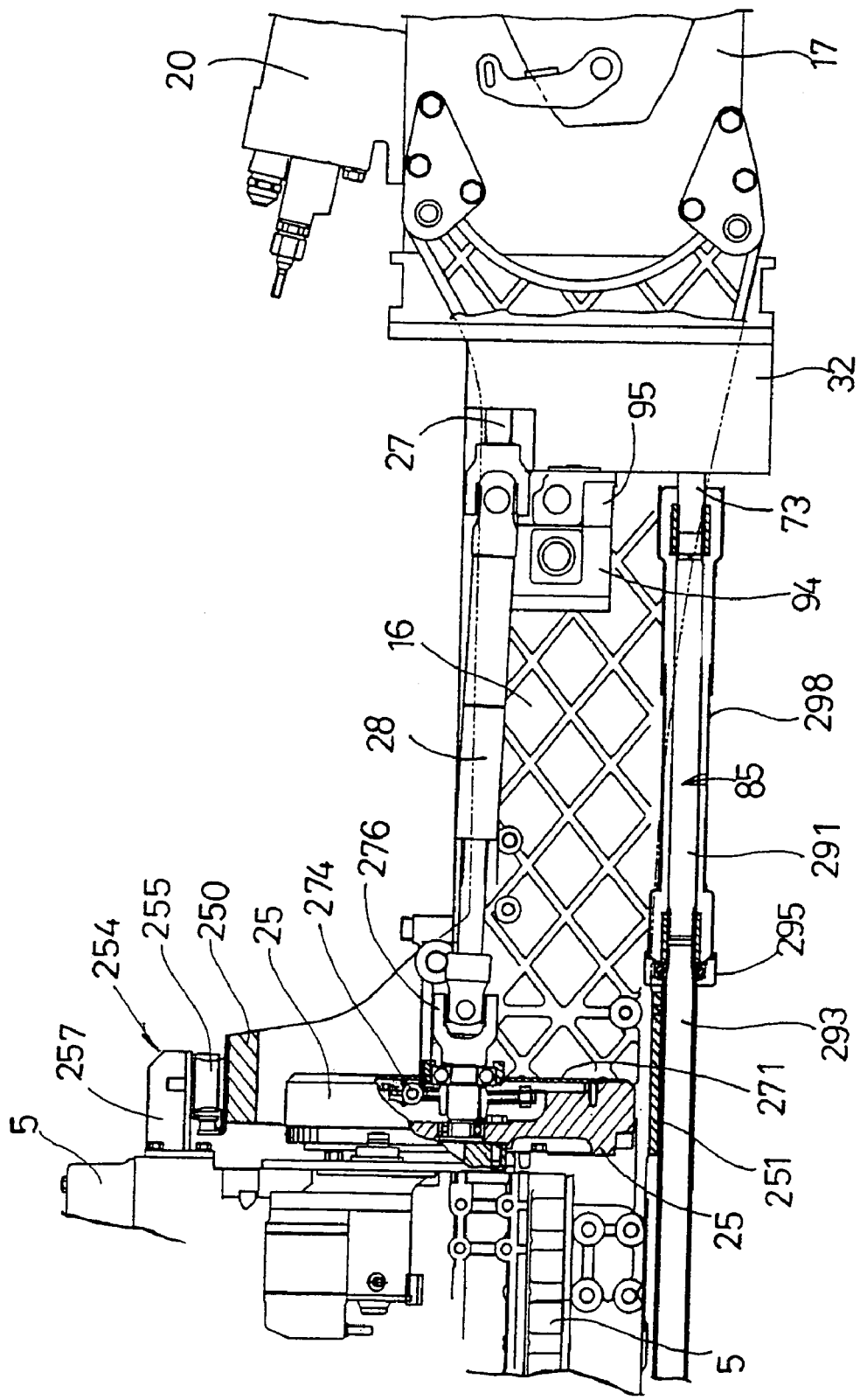
FIG. 26 is an illustrative view to show how power is transmitted from the engine to the transmission case.

Reference will be made to FIG. 24 through FIG. 26 to describe a transmission structure between the engine 5 and the transmission case 17. The flywheel 25 has a back surface formed with a recess 270. The recess 270 is provided with a main drive shaft 26 therein. On the back surface of the flywheel 25, a disc-shaped bearing support member 271 is fastened with bolts 272. The bearing support member 271 is substantially flush with the back surface of the flywheel 25. The recess 270 is substantially enclosed in the bearing support member 271. The main drive shaft 26 has its front end portion supported by the front face side of the flywheel 25 via a ball bearing 273. The main drive shaft 26 has its intermediate portion surrounded by a spring damper 274 in order to reduce vibration generated by rotation of an engine output shaft 24, etc. The flywheel 25 and the main drive shaft 26 are connected with each other via the damper 27. The main drive shaft 26 has its rear end portion supported by the bearing support member 271 via a ball bearing 275. The rear end of the main drive shaft 26 extends out of the bearing support member 271 toward the rear. The extended rear end of the main drive shaft 26 is connected with the power transmission shaft 28 via a universal joint 276.

Reference will be made to FIG. 12, FIG. 21, FIG. 22, FIG. 24 and FIG. 25 to describe a transmission structure between the front axle case 13 and the transmission case 17. The front-wheel drive shaft 85 includes a rear drive shaft 291 which is connected with a front-wheel output shaft 73 via a shaft coupling 290, and a front drive shaft 293 which is connected with a front-wheel input shaft 84 via a shaft coupling 292. The rear drive shaft 291 has its front end connected with a rear end of the front drive shaft 293 via a shaft coupling 294. The rear end portion of front drive shaft 293 is supported by the intermediate bearing member 295 via a ball bearing 296. The intermediate bearing member 295 has a mounting plate 296 welded thereto. The mounting plate is fastened to the lower connecting member 251 with bolts 297. The rear drive shaft 291 and the front drive shaft 293 are covered by a rear and a front shaft covers 298, 299.

As is clear from the above description and FIG. 17, FIG. 24, etc., the working vehicle includes engine frames 14 for mounting an engine 5, and a pair of right and left vehicle frames 16, with rear portions of the engine frame connected with front portions of the vehicle frames, and a transmission case 17 being placed between rear portions of the right and left vehicle frames 16. With these arrangements, the right and the left vehicle frames 16 are connected via an upper connecting member 250 and a lower connecting member 251, the engine 5 has an output portion provided with a flywheel 25, and the flywheel 25 has its outer circumference surrounded by the right and the left vehicle frames 16 and the upper and the lower connecting members 250, 251. This enables to reinforce the right and left vehicle frames 16, near the engine 5 using the upper connecting member 250 and the lower connecting member 251, eliminating the conventional need for e.g. a highly rigid cylindrical member in order to provide the right and left vehicle frames 16. The upper and the lower connecting members 250, 251 can be used to improve rigidity of the right and left vehicle frames 16 and to protect the flywheel 25. Thus, it becomes possible to simplify or reduce the weight of the traction unit chassis in the tractor 1 for example, and thereby to reduce manufacturing cost.

As is clear from the above description and FIG. 24, FIG. 25, etc., the rear vibration isolation members 254 and the bonnet support struts 260 which serve as a mount for the engine 5, fixtures for the bonnet 6, etc., are located on the upper surface side of the upper connecting member 250. This allows the rear vibration isolation members 254 and the bonnet support struts 260 to be placed at an intermediate height on the side of the engine 5. Thus, it is possible for example, to provide the mount for the engine 5, i.e. the rear vibration isolation members 254, and the mount for the bonnet 6, i.e. the bonnet support struts 260 (hinges for open/close pivotal movement) above the flywheel 25 in a compact manner.

As is clear from the above description and FIG. 24, FIG. 25, etc., the front-wheel drive shaft 85, which serves as the drive shaft that transmits power from the transmission case 17 to the front wheels 3, has its intermediate bearing member 295 supported by the lower connecting member 251. This enables to reduce vibration of the front-wheel drive shaft 85 at the lower connecting member 251, and therefore to provide the front-wheel drive shaft 85 closely to e.g. the bottom surface of the engine 5.

Figure 6:
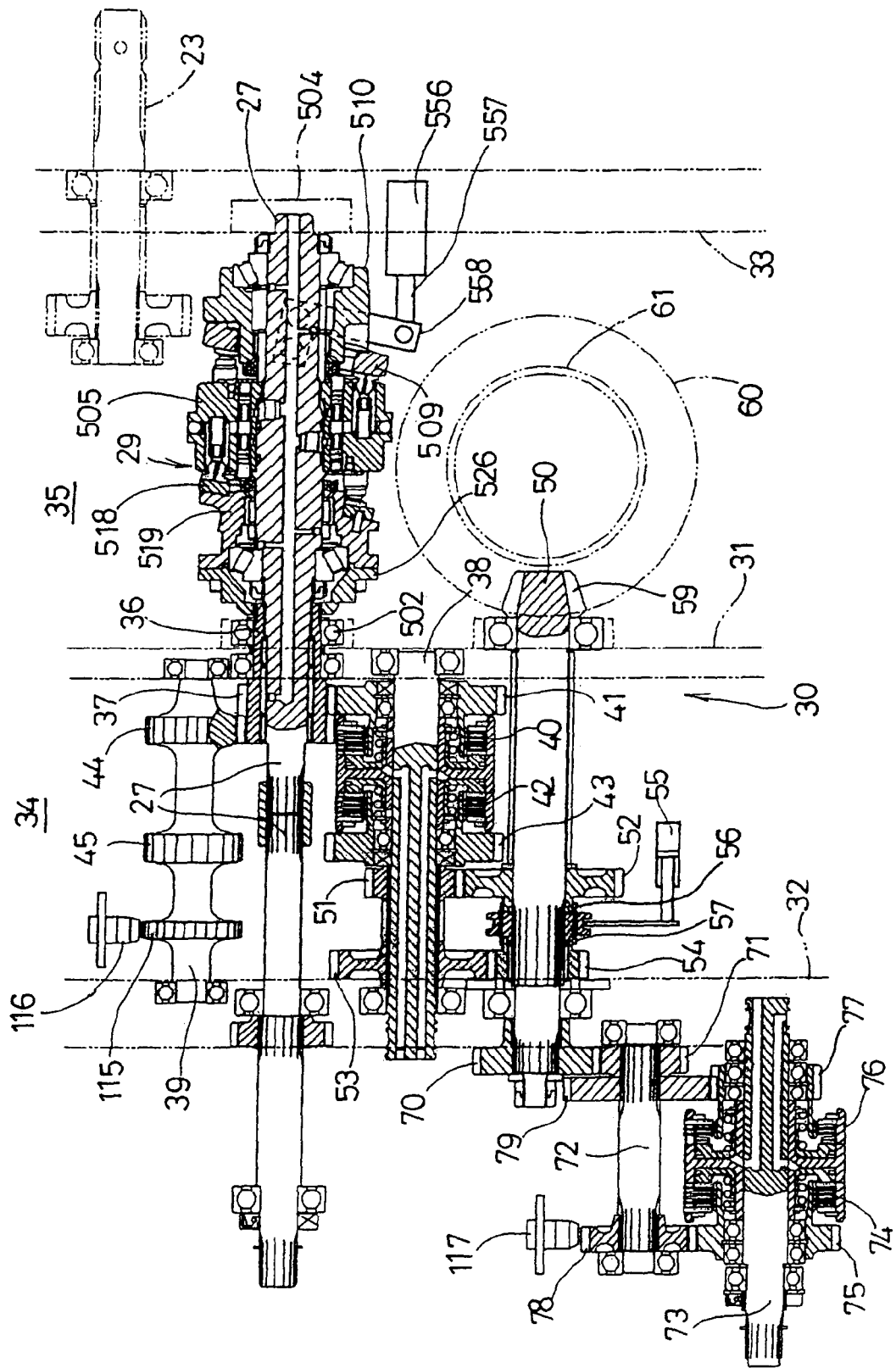
FIG. 6 is an illustrative diagram of a traction transmission section in a transmission case.
Figure 7:
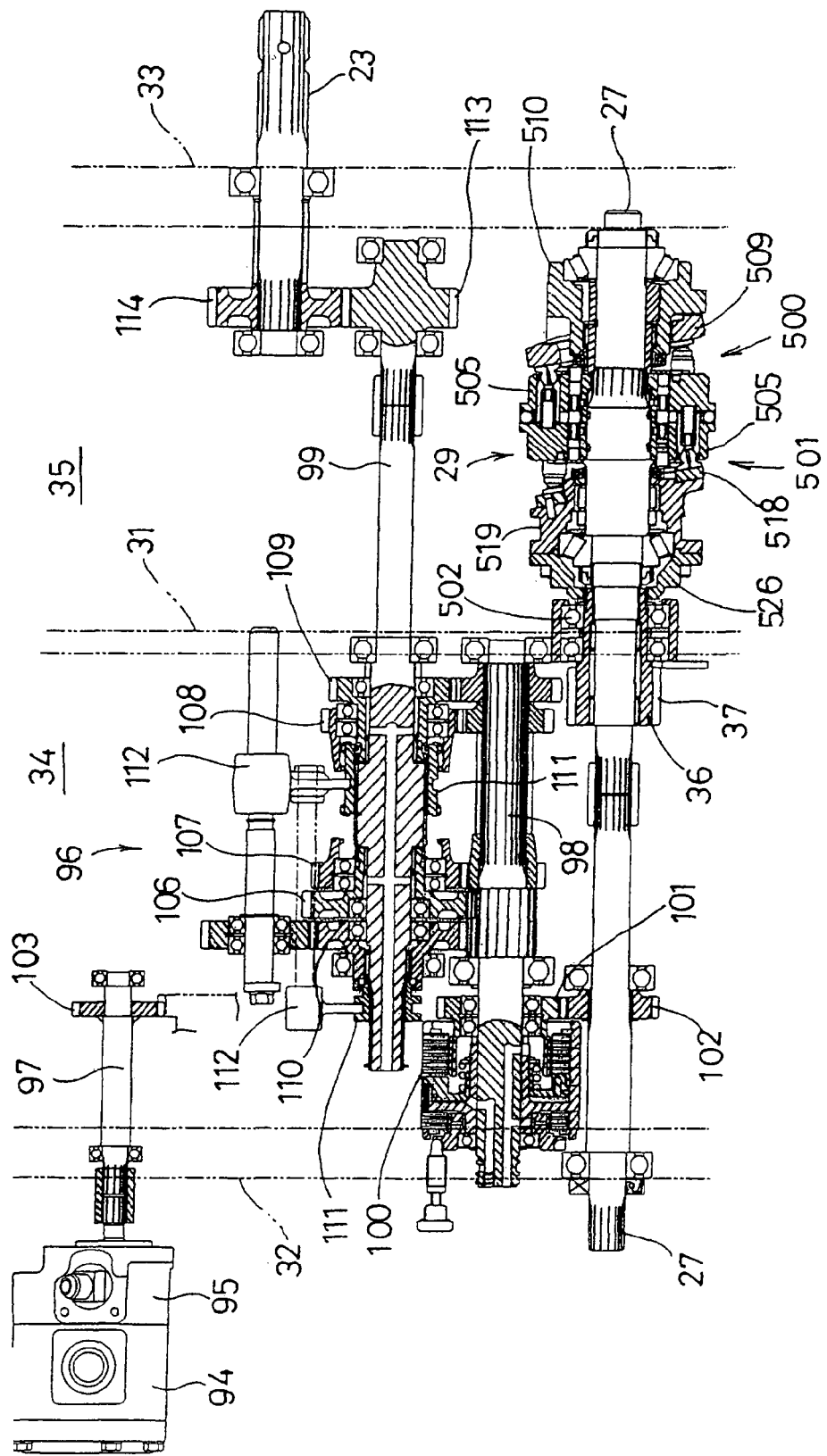
FIG. 7 is an illustrative diagram of a PTO transmission section in the transmission case.

Now, FIG. 5 through FIG. 7 show the transmission case 17. The transmission case 17 has its inside divided by a partition wall 31 into a front and a rear portions. On the front side of the transmission case 17, a front wall member 32 is bolted detachably. On the rear side of the transmission case 17, a rear wall member 33 is bolted detachably. The transmission case 17 has a box shape, and inside the transmission case 17, a front chamber 34 and a rear chamber 35 are formed. The front chamber 34 and the rear chamber 35 communicate with each other, allowing the hydraulic oil (lubricant oil) to move inside the box.

As shown in FIG. 5, the front wall member 32 is provided with a front wheel drive case 69 to be described later. The front chamber 34 is provided with a traction sub-transmission gear mechanism 30 and a PTO transmission gear shift mechanism 96 to be described later. The rear chamber 35 is provided with a hydrostatic transmission 29 which serves as a traction main-transmission mechanism, and a differential gear mechanism 58 to be described later.

From a rear side surface of the engine 5, an engine output shaft 24 projects toward the rear. The engine output shaft 24 is directly connected with the flywheel 25. The main drive shaft 26 which projects rearward from the flywheel 25 and the main-transmission input shaft 27 which projects forward from the front surface of the transmission case 17 are connected with each other via a telescopic power transmission shaft 28 which has two ends each provided with a universal shaft coupling. The rotation of the engine 5 is transmitted to the main-transmission input shaft 27 in the transmission case 17, then to the hydrostatic transmission 29 and to the traction sub-transmission gear mechanism 30 for appropriate speed shift, before the power is transmitted to the rear wheels 4 via the differential gear mechanism 58.

Also, rotation of the engine 5 is appropriately changed by the traction sub-transmission gear mechanism 30, and then transmitted to the front wheels 3 via the front wheel drive case 69 and a differential gear mechanism 86 in the front axle case 13.

Figure 8:
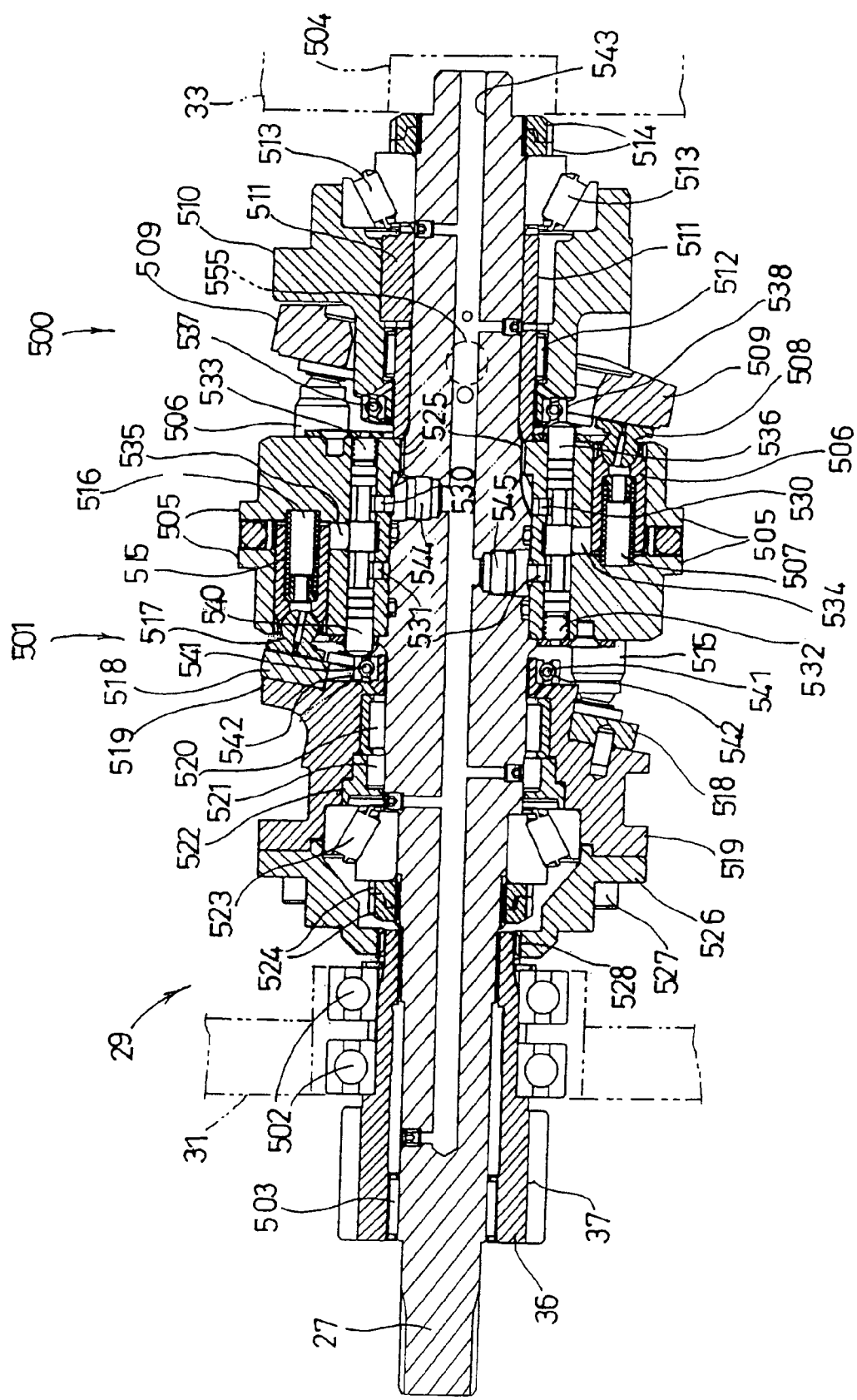
FIG. 8 is an illustrative diagram of a hydrostatic transmission in the transmission case.
Figure 9:
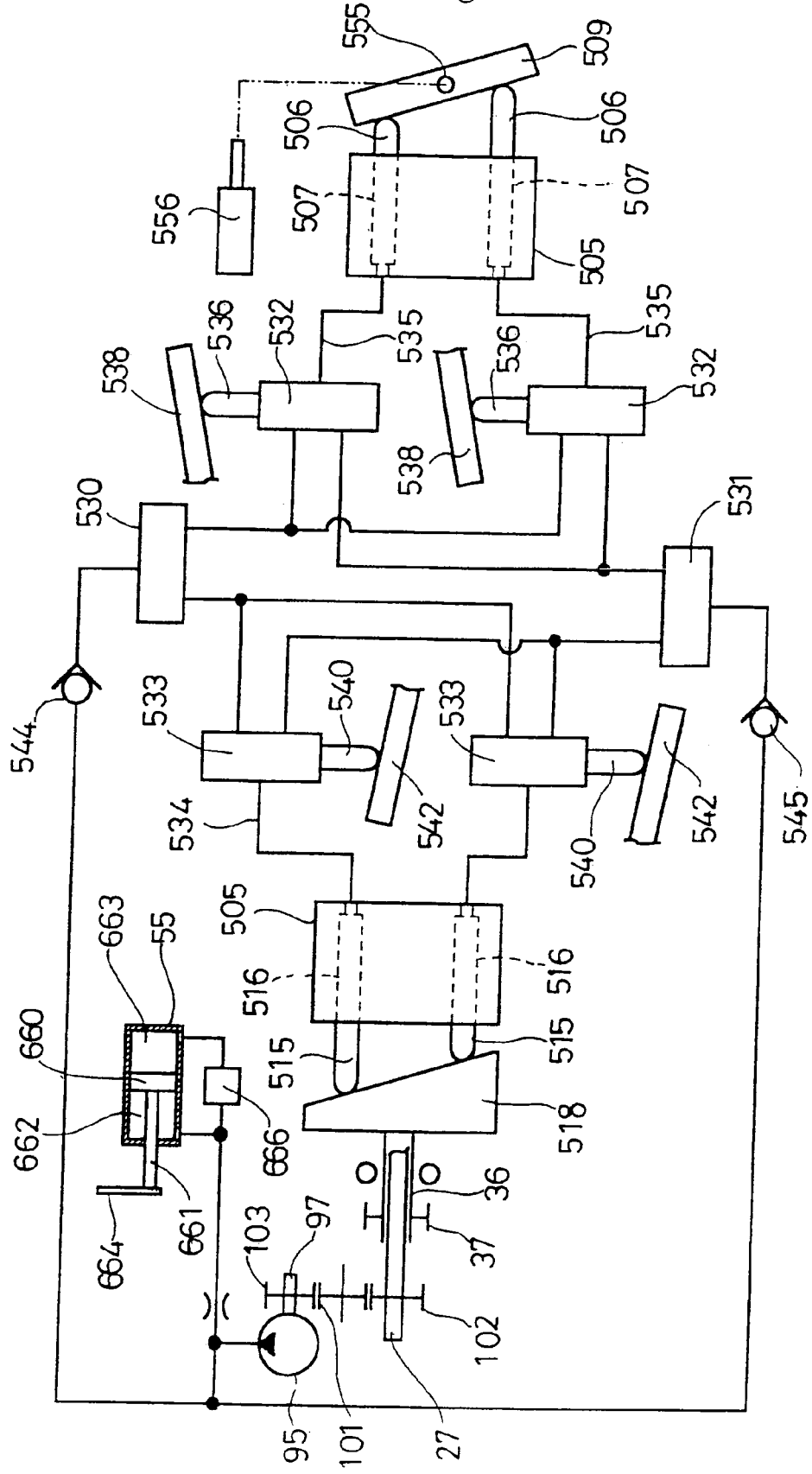
FIG. 9 is a hydraulic circuit diagram of the hydrostatic transmission in the transmission case.
Figure 10:
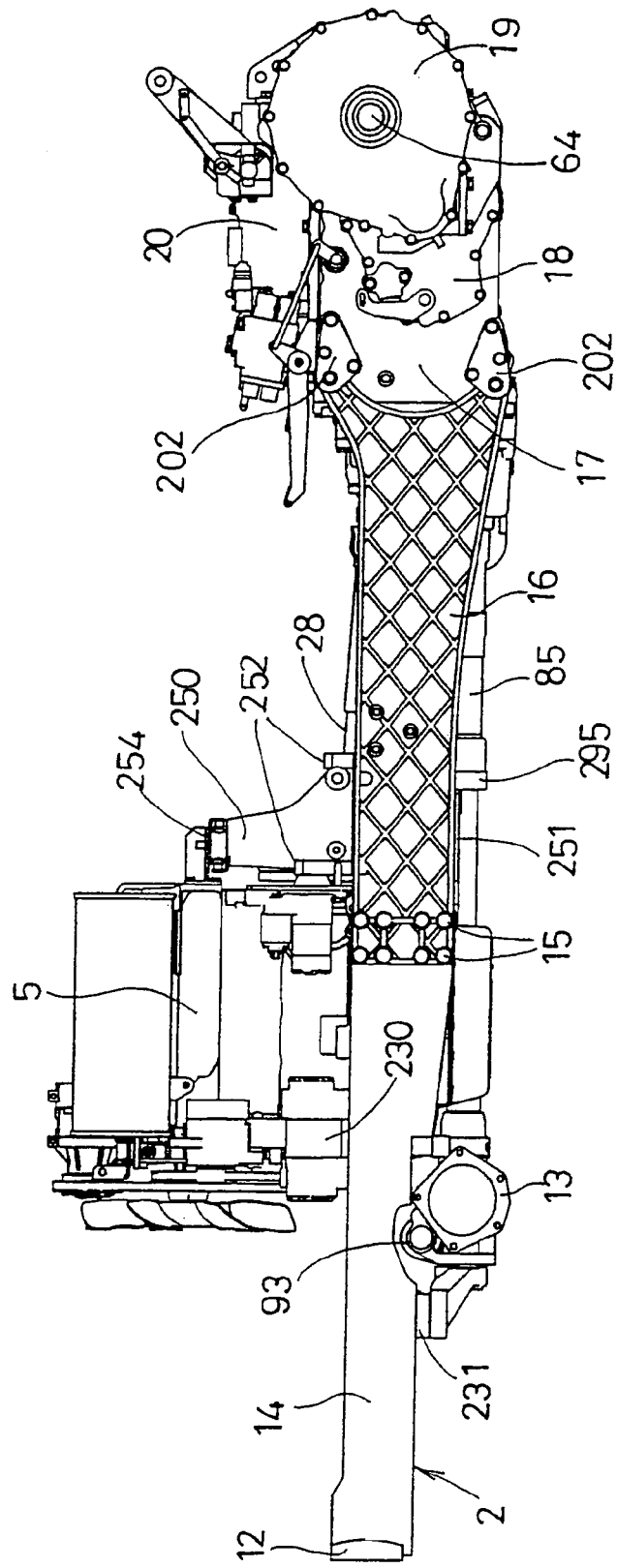
FIG. 10 is a side view of the traction unit chassis, an engine and the transmission case.
Figure 11:
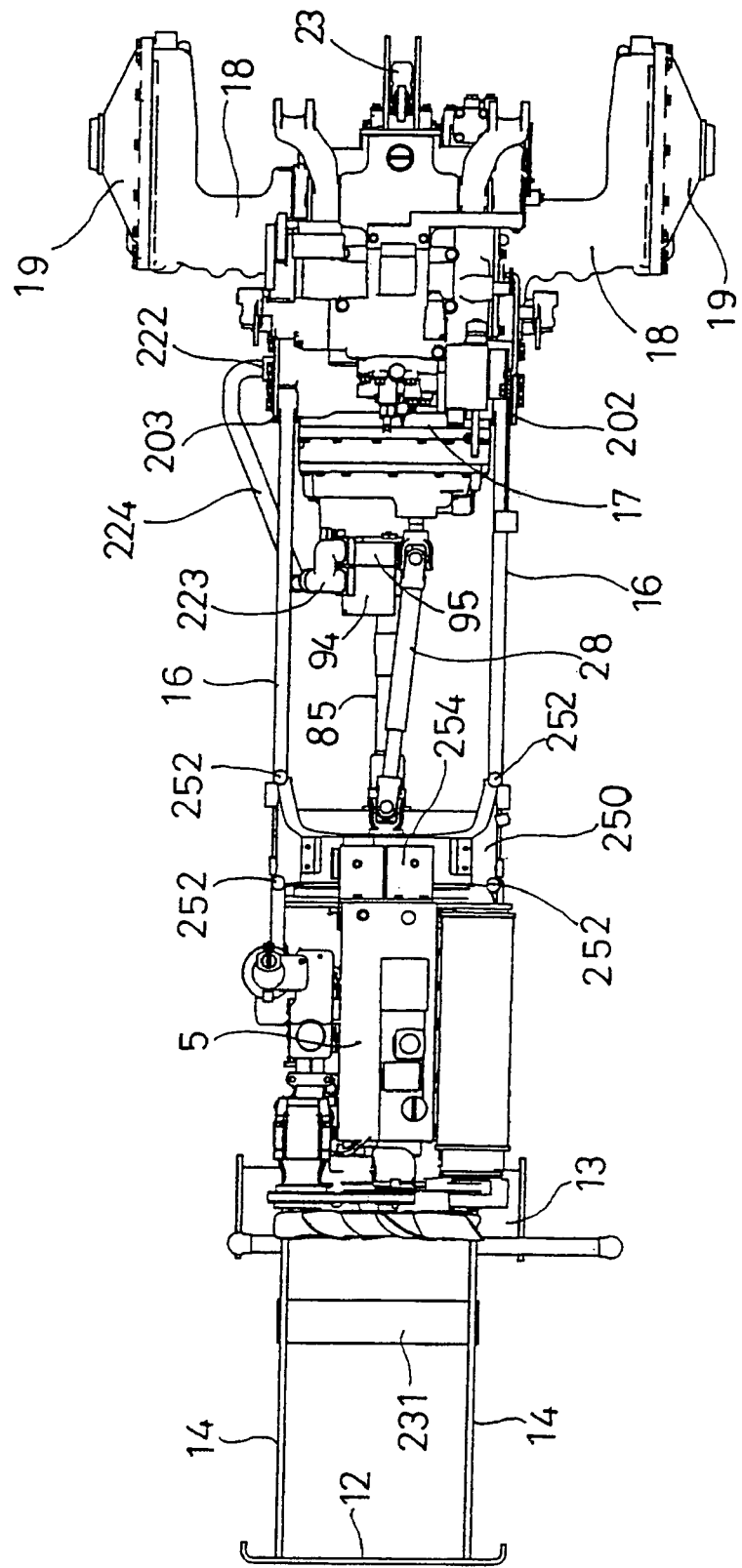
FIG. 11 is a plan view of the traction unit chassis, the engine and the transmission case.

Next, FIG. 8 and FIG. 9 show an inline hydrostatic transmission 29 in which a main-transmission input shaft 27 and a main-transmission output shaft 36 are laid centrically to each other. The hydrostatic transmission 29 is located inside the rear chamber 35 with a main-transmission input shaft 27. The main-transmission input shaft 27 has its rear end extended to the rear wall member 33. The rear end of the main-transmission input shaft 27, which is the side away from the input side (front side) of the main-transmission input shaft, is rotatably supported by the rear wall member 33 via a ball bearing 504.

On the front side of the hydrostatic transmission 29, the tubular, main-transmission output shaft 36 is inserted around the input end portion of the main-transmission input shaft 27. The main-transmission output shaft 36 is provided with a main-transmission output gear 37 for taking main-transmission output power from the hydrostatic transmission 29. The main-transmission output shaft 36 has its intermediate portion penetrating the partition wall 31, having its front and rear ends extending into the front chamber 34 and the rear chamber 35 respectively. The intermediate portion of the main-transmission output shaft 36 is rotatably supported by the partition wall 31 via two sets of ball bearings 502. The main-transmission output shaft 36 has its front end portion provided with a main-transmission output gear 37. The main-transmission input shaft 27 has its input side (front end portion) extended forward, to project farther than the front end of the main-transmission output shaft 36. The input side of the main-transmission input shaft 27 is supported rotatably in a shaft hole of the main-transmission output shaft 36 via a roller bearing 503 (See FIG. 9).

The hydrostatic transmission 29 includes a variable-capacity hydrostatic pump portion 500, and a fixed-capacity hydrostatic motor portion 501 driven by high-pressure hydraulic oil outputted from the hydrostatic pump portion 500.

At a substantially intermediate location between the partition wall 31 and the rear wall member 33, there is a cylinder block 505 for the hydrostatic pump portion 500 and the hydrostatic motor portion 501 inserted around the main-transmission input shaft 27. The main-transmission input shaft 27 and the cylinder block 505 are connected with each other via a spline 525. The hydrostatic pump portion 500 is on the side away from the input end of the main-transmission input shaft 27, and next to the cylinder block 505. The hydrostatic motor portion 501 is on the other side of the cylinder block 505 which is on the input side of the main-transmission input shaft 27.

The hydrostatic pump portion 500 is provided with a first holder 510 which is fixed on an inner side surface of the transmission case 17 to face the side surface of the cylinder block 505, a pump swash plate 509 which is placed on the first holder 510 so that its tilting angle is variable with respect to the axis of the main-transmission input shaft 27, shoes 508 which are slidable on the pump swash plate 509, pump plungers 506 each connected with one of the shoes 508 via a ball joint, and first plunger holes 507 which allow the pump plungers 506 to slide in and out of the cylinder block 505. The pump plungers 506 have an end projecting out of the cylinder block 505 toward the pump swash plate 509 (to the right in FIG. 8). The hydrostatic pump portion 500 is constituted by the cylinder block 505, the pump plungers 506, the shoes 508, the pump swash plate 509 and the first holder 510.

Between the main-transmission input shaft 27 and the first holder 510 are a sleeve 511 inserted around the main-transmission input shaft 27, a roller bearing 512, and a roller bearing 513 for radial and thrust loads. A nut 514 is provided at a rear end of the main-transmission input shaft 27 in order to prevent the roller bearing 513 from coming off.

The cylinder block 505 is provided with the same number of first spool valves 536 as the pump plungers 506. The first holder 510 is provided with a first radial bearing 537. The first radial bearing 537 is tilted on the first holder 510 at a predetermined angle with respect to the axis of the main-transmission input shaft 27. With reference to FIG. 8, the tilt of the first radial bearing 537 is set in such a manner that the bearing surface is farthest from the face of the cylinder block 505 at a 90 degree rotation angle with respect to the pump swash plate 509 (the side facing the viewer in FIG. 8), and closest to the face of the cylinder block 505 about 180 degree at the opposite side (the side facing away from the viewer in FIG. 8).

On the other hand, the hydrostatic motor portion 501 is provided with a second holder 519 which is faced toward the face of the cylinder block 505, a motor swash plate 518 which is placed on the second holder 519 at a fixed angle with respect to the axis of the main-transmission input shaft 27, shoes 517 which are slidable on the motor swash plate 518, motor plungers 515 each connected with one of the shoes 517 via a ball joint, and second plunger holes 516 which allow the motor plungers 515 to slide in and out of the cylinder block 505. The motor plungers 515 have their end projecting out of the cylinder block 505 toward the motor swash plate 518 (to the left in FIG. 8). The hydrostatic motor portion 501 is constituted by the cylinder block 505, the motor plungers 515, the shoes 517, the motor swash plate 518 and the second holder 519.

The second holder 519 has a joint member 526 fastened thereto with bolts 527. The output shaft 36 and the joint member 525 are connected with each other via spline 528.

Between the main-transmission input shaft 27 and the second holder 519 are roller bearings 520, 521 for radial load, a sleeve 522 inserted around the main-transmission input shaft 27, and a roller bearing 523 for radial and thrust loads. A nut 524 is provided in order to prevent the roller bearing 523 from coming off the main-transmission input shaft 27.

The cylinder block 505 is provided with the same number of second spool valves 540 as the motor plungers 515. The second holder 519 is provided with a second radial bearing 541. The second radial bearing 541 is tilted on the first holder 510 at a predetermined angle with respect to the axis of the main-transmission input shaft 27. With reference to FIG. 8, the tilt of the second radial bearing 541 is set in such a manner that the bearing surface is closest to the face of the cylinder block 505 at a 90 degree rotation angle with respect to the motor swash plate 518 (the side facing the viewer in FIG. 8), and farthest from the side surface of the cylinder block 505 at about 180 degree opposite side (the side facing away from the viewer in FIG. 8).

The pump plungers 506 and the motor plungers 515 which are provided in the same number as the pump plunger 506 are disposed alternately to each other on the same circumference of a circle made by rotation of the cylinder block 505 about its center of rotation.

In addition, an annular, first oil chamber 530 and an annular, second oil chamber 531 are formed in a shaft hole of the cylinder block 505 where the main-transmission input shaft 27 is inserted. The cylinder block 505 is formed with first valve holes 532 and second valve holes 533 at a substantially uniform interval on a circumference of a circle made around the center of rotation. The first valve holes 532 and the second valve holes 533 communicate with the first oil chamber 530 and the second oil chamber 531 respectively. The first plunger holes 507 communicate with the first valve holes 532 via a first oil path 534, while the second plunger holes 516 communicate with the second valve holes 533 via a second oil chamber 531.

The first valve holes 532 are inserted with the first spool valves 536. The first spool valves 536 are located at a substantially uniform circumferential interval on the circle in the cylinder block 505 which rotates around the center of rotation. The first spool valves 536 have their outer ends projected toward the first holder 510 by an elastic back spring pressure from the first valve holes 532, and thus the outer ends of the first spool valves 536 make contact with a face of an outer ring 538 of the first radial bearing 537. As the cylinder block 505 makes a complete rotation, the first spool valves 536 make a complete reciprocating travel, with the first plunger holes 507 making alternating communication with the first oil chamber 530 and the second oil chamber 531, via the first valve hole 532 and the first oil path 534.

The second valve holes 533 are inserted with the second spool valves 540. The second spool valves 540 are located at a substantially uniform circumferential interval on the circle in the cylinder block 505 which rotates around the center of rotation. The second spool valves 540 have their outer ends projected toward the second holder 519 by an elastic back spring pressure from the second valve holes 533, and thus the outer ends of the second spool valves 540 make contact with a face of an outer ring 542 of the second radial bearing 541. As the cylinder block 505 makes a complete rotation, the second spool valves 540 make a complete reciprocating travel, with the second plunger holes 516 making alternate communication with the first oil chamber 530 and the second oil chamber 531, via the second valve holes 533 and the second oil path 535.

Further, the main-transmission input shaft 27 has its center portion formed with an axial hydraulic oil supply path 543. The supply path 543 has an opening at a rear end face of the main-transmission input shaft 27, and communicates with an output port of the traction hydraulic pump 95. In addition, a first charge valve 544 is provided for charging the hydraulic oil from a hydraulic oil supply path 543 to the first oil chamber 530, and a second charge valve 545 is provided for charging the hydraulic oil from the hydraulic oil supply path 543 to the second oil chamber 531.

With the above arrangements, a closed-loop hydraulic circuit is formed which involves the first and the second plunger holes 507, 516 and the first and the second oil chambers 530, 531, and to this circuit, the hydraulic oil is supplied from the hydraulic oil supply path 543 via the first and the second charge valves 544, 545. It should be noted here that rotating portions of the hydrostatic pump portion 500 and the motor portion 501 are provided with check valves, for lubrication by a supply of hydraulic oil from the hydraulic oil supply path 543.

The pump swash plate 509 is placed around a small-diameter portion of the first holder 510, on a tilt angle adjusting fulcrum 555 (See FIG. 9). The tilt angle of the pump swash plate 509 is variable with respect to the axis of the main-transmission input shaft 27, and is provided with a main-transmission hydraulic cylinder 556 (See FIG. 9) which serves as an actuator for varying the tilt angle of the pump swash plate 509 with respect to the axis of main-transmission input shaft 27, and thus works in a main speed-shift operation. The main-transmission hydraulic cylinder 556 is fixed to the rear wall member 33. The main-transmission hydraulic cylinder 556 has a piston rod 557 which has a tip portion connected with a main speed-shift arm 558 (See FIG. 6). The piston rod 557 is connected with the tilt angle adjusting fulcrum 555 via the main speed-shift arm 558, so that advancement or retraction of the piston rod 557 will alter the tilt angle of the pump swash plate 509 to cause a speed shift in the main-speed-shift process in the hydrostatic transmission 29. It should be noted here that the first holder 510 is fixed to a non-rotating portion of the transmission case 17 via unillustrated connection means fixed in order to prevent the pump swash plate 509 from rotating with respect to the main-transmission input shaft 27.

Hereinafter, description will cover the main-speed-shift process of the above-described inline hydrostatic transmission 29. When the hydraulic cylinder 556 is controlled via a main speed-shift lever, etc., the tilt angle of the pump swash plate 509 is altered with respect to the axis of main-transmission input shaft 27.

In a case when the tilt angle of the pump swash plate 509 is held at about zero degree so that the pump swash plate 509 is substantially perpendicular to the axis of main-transmission input shaft 27, rotation of the cylinder block 505 will maintain the pump plungers 506 substantially still, without making a reciprocating movement in or out of the first plunger holes 507; the hydraulic oil in the first plunger holes 507 is not moved from the first oil path 534 toward the first valve holes 532 in the output stroke of the pump plunger 506, so there is no supply of hydraulic oil from the first plunger holes 507 to the second plunger holes, and therefore the motor plungers 515 do not make advancing motions. Likewise, there is no hydraulic oil sucked into the first plunger holes 507 in the sucking stroke of pump plungers 506, so there is no output of hydraulic oil from the second plunger holes 516 to the first plunger holes 507, and therefore the motor plungers 515 do no make retracting motions.

In other words, when the tilt angle of the pump swash plate 509 is about zero, the speed-varying pump portion 500 does not drive the speed-varying motor portion 501. Therefore, the motor swash plate 518 is essentially fixed onto the cylinder block 505 via the motor plungers 515, causing the cylinder block 505 and the motor swash plate 518 to rotate in the same direction at substantially the same rpm, thereby rotating the main-transmission output shaft 36 at substantially the same rpm as the main-transmission input shaft 27. Thus, the rotation of the main-transmission input shaft 27 is transmitted to the main-transmission output gear 37 without change in speed.

Next, in a case when the pump swash plate 509 is tilted with respect to the axis of main-transmission input shaft 27, rotation of the cylinder block 505, which rotates together with the main-transmission input shaft 27, causes the outer ring 538 of the first radial bearing 537 to slide the first spool valves 536 in a reciprocating pattern; at every half rotation of the cylinder block 505, the first plunger holes 507 make communication with the first oil chamber 530 or the second oil chamber 531 in an alternating manner. Likewise, the outer ring 542 of the second radial bearing 541 makes the second spool valves 540 slide in a reciprocating pattern; at every half rotation of the cylinder block 505, the second plunger holes 516 make communication with the first oil chamber 530 or the second oil chamber 531 in an alternating manner. A closed-loop hydraulic circuit is formed involving the first plunger holes 507 and the second plunger holes 516: Hydraulic oil is pumped from the first plunger holes 507 to the second plunger holes 516 in the outputting stroke of the pump plungers 506 whereas hydraulic oil is returned from the second plunger holes 516 to the first plunger holes 507 in the sucking stroke of the pump plungers 506. In essence, there is an operation of an axial piston pump and motor.

In the above, when the pump swash plate 509 is tilted in a certain direction (at a positive tilt angle) with respect to the axis of main-transmission input shaft 27, the motor swash plate 518 is rotated in the same direction as the cylinder block 505, to increase the rotating speed (normal rotation) of the speed-varying motor 501, causing the main-transmission output shaft 36 to rotate at a higher rpm than the main-transmission input shaft 27; thus, rotation speed is increased when transmitted from the main-transmission input shaft 27 to the main-transmission output gear 37. Specifically, the main-transmission output gear 37 receives a sum of the number of revolutions of the main-transmission input shaft 27 and the number of revolutions of the speed-varying motor 501 which is driven by the speed-varying pump 500. Therefore, within a range of rpm which is higher than the rpm of the main-transmission input shaft 27, the varied output (traction speed) from the main-transmission output gear 37 is proportional to the tilt (positive tilt angle) of the pump swash plate 509, and a maximum traction speed is achieved at a maximum tilt angle (positive tilt angle) of the pump swash plate 509.

Then, when the pump swash plate 509 is tilted in the other direction (at a negative tilt angle) with respect to the axis of main-transmission input shaft 27, the motor swash plate 518 is rotated in the reverse direction as from the cylinder block 505, to decrease the rotating speed (reverse rotation) of the speed-varying motor 501, causing the main-transmission output shaft 36 to rotate at a lower rpm than the main-transmission input shaft 27; thus, rotation speed is decreased when transmitted from the main-transmission input shaft 27 to the main-transmission output gear 37.

Specifically, the main-transmission output gear 37 receives a difference resulted from a subtraction of the number of revolutions of the speed-varying motor 501 driven by the speed-varying pump 500 from the number of revolutions of the main-transmission input shaft 27. Therefore, within a range of rpm which is lower than the rpm of the main-transmission input shaft 27, the varied output (traction speed) from the main-transmission output gear 37 is proportional to the tilt (negative tilt angle) of the pump swash plate 509, and a minimum traction speed is achieved at a maximum tilt angle (negative tilt angle) of the pump swash plate 509.

Next, as shown in FIG. 5, FIG. 6, the front chamber 34 in the transmission case 17 is provided with a forward traction gear 41 and a reverse traction gear 43 for switching between forward traction and reverse traction, and a traction sub-transmission gear mechanism 30 for switching between low speed traction and high speed traction.

Description will now cover the switching between forward traction and reverse traction performed by using the forward traction gear 41 and the reverse traction gear 43. As shown in FIG. 6, a traction counter shaft 38 and a reverse rotation shaft 39 are disposed inside the front chamber 34 where the main-transmission output gear 37 is placed. The traction counter shaft 38 has a forward traction gear 41 which is brought to engagement by a forward traction multiple wet disc hydraulic clutch 40, and a reverse traction gear 43 which is brought to engagement by a reverse traction multiple wet disc hydraulic clutch 42. The main-transmission output gear 37 makes engagement with the forward traction gear 41. The main-transmission output gear 37 makes engagement with a reverse rotation gear 44 provided on the reverse rotation shaft 39. The reverse traction gear 43 makes engagement with a reverse rotation output gear 45 provided on the reverse rotation shaft 39.

With the above, when the main speed-shift lever or a forward traction switch (not illustrated) is operated for forward traction, a forward traction hydraulic solenoid valve 46 actuates a clutch cylinder 47, making engagement with the forward traction hydraulic clutch 40 thereby establishing engagement between the main-transmission output gear 37 and the traction counter shaft 38 via the forward traction gear 41 (See FIG. 5 and FIG. 6).

On the other hand, when the main speed-shift lever or a reverse traction switch (not illustrated) is operated for reverse traction, a reverse traction hydraulic solenoid valve 48 actuates the clutch cylinder 47, making engagement of the reverse traction hydraulic clutch 42 thereby establishing engagement between the main-transmission output gear 37 and the traction counter shaft 38 via the forward traction gear 41 (See FIG. 5 and FIG. 6).

It should be noted here that when the main speed-shift lever (not illustrated) is in a neutral position (when both of the forward traction and reverse traction switches are turned OFF), both of the forward and reverse multiple wet disc hydraulic clutches 40, 42 are disengaged, and the traction force outputted from the main-transmission output gear 37 to the front wheels 3 and the rear wheels 4 becomes substantially zero (a state where main clutch is turned OFF).

Next, description will be made for switching between low speed traction and high speed traction performed via the traction sub-transmission gear mechanism 30. As shown in FIG. 5 and FIG. 6, the traction sub-transmission gear mechanism 30 is disposed in the front chamber 34 of the transmission case together with a sub transmission shaft 50. Sub transmission low speed gears 51, 52 and sub transmission high speed gears 53, 54 are provided between the traction counter shaft 38 and the sub transmission shaft 50. Provided further are a low speed traction clutch 56 and a high speed traction clutch 57 which are engaged and disengaged by a sub transmission hydraulic cylinder 55. With these, operation of a sub transmission lever (not illustrated), operation of a high/low sub transmission switch (not illustrated), or rpm detection of the engine 5 actuates the sub transmission hydraulic cylinder 55 to engage the low speed traction clutch 56 or the high speed traction clutch 57, bringing the sub transmission shaft 50 into engagement with the low speed gear 52 or the high speed gear 54, and thus outputting traction drive force from the sub transmission shaft 50 to the front wheels 3 and the rear wheels 4.

The sub transmission shaft 50 penetrates the partition wall 31, with its rear end located inside of the rear chamber 35 of the transmission case 17 (See FIG. 5). The sub transmission shaft 50 has its rear end provided with a pinion 59. Inside the rear chamber 35 is a differential gear mechanism 58 which transmits traction drive force to the right and left rear wheels 4. The differential gear mechanism 58 is provided with a ring gear 60 which makes engagement with the pinion 59 at the rear end of the sub transmission shaft 50, a differential gear case 61 provided on the ring gear 60, and right and left differential output shafts 62. The differential output shafts 62 are engaged with final gears 63, etc., to transmit power to the rear axles 64, and drives the rear wheels 4 on the rear axles 64.

The right and left differential output shafts 62 are provided with right and left brakes 65 respectively. When a brake pedal 66 is operated, the right and left brakes 65 are actuated; on the other hand, the brakes 65 are also controlled automatically through turning angle detection of the steering wheel 9, etc., which actuates an auto-braking solenoid valve 67 to move a brake cylinder 68 when making a U-turn for example.

Next, reference will be made to FIG. 5 and FIG. 6, to describe switching between two-wheel drive and four-wheel drive by the front and the rear wheels 3, 4. A front-wheel drive case 69 is provided on the front wall member 32 in the transmission case 17. The front-wheel drive case 69 is provided with a front wheel input shaft 72 and a front wheel output shaft 73. The front wheel input shaft 72 is connected with the sub transmission shaft 50 by gears 70, 71. The front wheel output shaft 73 is provided thereon with a four wheel drive gear 75 which is brought to engagement by a four wheel drive hydraulic clutch 74, and a double speed traction gear 77 which is brought to engagement by a double speed traction hydraulic clutch 76. The four wheel drive gear 75 and the double speed traction gear 77 are engaged with the front wheel input shaft 72 by gears 78, 79 respectively.

With the above arrangement, when a 2WD-4WD switching lever (not illustrated) is switched to four wheel drive, a four wheel drive hydraulic solenoid valve 80 actuates a clutch cylinder 81 to engage the four wheel drive hydraulic clutch 74, whereby the front wheel input shaft 72 and the front wheel output shaft 73 are engaged with each other by the four wheel drive gear 75 so that the front wheels 3 are driven together with the rear wheels 4.

Next, reference will be made-to FIG. 5 and FIG. 6, to describe switching of the front wheels 3 to and from double speed traction. When a U-turn attempt (turning at a headland in the field) is detected from the steering wheel 9, a double speed traction hydraulic solenoid valve 82 actuates a clutch cylinder 83, to engage the double speed drive hydraulic clutch 76, thereby bringing the front wheel input shaft 72 and the front wheel output shaft 73 into engagement with each other by the double speed traction gear 77. This causes the front wheels 3 to be driven approximately at a double speed as compared to driving the front wheels 3 by the four wheel drive gear 75.

As shown in FIG. 5, a front wheel input shaft 84 which projects out of the front axle case 13 toward rear and the front wheel output shaft 73 which projects out of the front surface of the transmission case 17 are connected with each other by a front-wheel drive shaft 85 which transmits power to the front wheels 3. Also, inside the front axle case 13, a differential gear mechanism 86 is placed which transmits traction drive force to the right and left front wheels 3.

The differential gear mechanism 86 is provided with a ring gear 88 for engagement with the pinion 87 at the front end of the front wheel input shaft 84, a differential gear case 89 provided on the ring gear 88, and right and left differential output shafts 90. The differential output shafts 90 are connected with the front axles 92 via the final gears 91, etc., so that the front axles 92 drive the front wheels 3 mounted thereon (See FIG. 5). Also, note that the front axle case 13 has an outer side surface on which the power steering hydraulic cylinder 93 is disposed for changing the direction of the front wheels in response to steering operation on the steering wheel 9 (See FIG. 3).

As shown in FIG. 5 and FIG. 7, on the front surface side in the front wall member 32 of the transmission case 17 are an implement hydraulic pump 94 for supplying hydraulic oil to the implement lift mechanism 20 and a traction hydraulic pump 95 for supplying hydraulic oil to each speed-shift sections of the transmission case 17 as well as to the power steering hydraulic cylinder 93. The transmission case 17 serves also as an hydraulic oil reservoir, and the hydraulic oil in the case 17 is supplied to each of the pumps 94, 95.

Next, reference will be made to FIG. 5 and FIG. 7, to describe speed shifting of the PTO shaft 23 (four normal rotation speeds and one reverse rotation speed). The front chamber 34 of the transmission case 17 is provided with the PTO transmission gear shift mechanism 96 which transmits power from the engine 5 to the PTO shaft 23, and a pump driving shaft 97 which transmits power from the engine 5 to each of the pumps 94, 95 (See FIG. 7).

As shown in FIG. 7, the PTO transmission gear shift mechanism 96 which will be described in detail later, has a PTO counter shaft 98 and a PTO speed shift output shaft 99. A PTO input gear 101, which is brought to engagement by a PTO hydraulic clutch 100, is inserted around the PTO counter shaft 98. The PTO input gear 101 is engaged with an input-side gear 102 provided on the main-transmission input shaft 27, and an output-side gear 103 provided on the pump driving shaft 97. The pump driving shaft 97 is connected with the main-transmission input shaft 27.

With the above arrangement, when a PTO clutch lever or a PTO clutch switch (not illustrated) is operated for engagement, a PTO clutch hydraulic solenoid valve 104 (See FIG. 5) activates a clutch cylinder 105 to engage the PTO hydraulic clutch 100, to establish connection between the main-transmission input shaft 27 and the PTO counter shaft 98 by the PTO input gear 101.

The PTO speed shift output shaft 99 is provided with the following PTO output gears: first gear 106, second gear 107, third gear 108, fourth gear 109 and reverse gear 110 (See FIG. 5 and FIG. 7).

The PTO speed shift output shaft 99 axially supports a slidable speed shifter 111 via a spline. One of the gears 106, 107, 108, 109, 110 is connected with the PTO speed shift output shaft 99 selectively by the speed shifter 111. The speed shifter 111 is connected with a speed shift arm 112 which is linked to a PTO speed shift lever (not illustrated). When a speed shift operation is made on the PTO speed shift lever (not illustrated, the speed shift arm 112 slides the speed shifter 111 linearly on the PTO speed shift output shaft 99, to select one of the gears 106, 107, 108, 109, 110 to be engaged with the PTO speed shift output shaft 99 (See FIG. 5 and FIG. 7). Thus, a PTO output of a controlled speed selected from the first, the second, the third, the fourth and the reverse gears is transmitted from the PTO speed shift output shaft 99 to the PTO shaft 23 via the gears 113, 114.

It should be noted here that as shown in FIG. 6, the reverse rotation shaft 39 is provided with a rotation detection gear 115, and is faced by a main speed shift pickup 116 which detects rotation of the main-transmission output gear 37 to allow detection by the main speed shift pickup 116, of the hydrostatic transmission 29 which serves as the main transmission mechanism. Also, a traction speed pickup 117 is provided for rpm detection of the gear 78 on the front wheel input shaft 72, so that traction speed (vehicle speed) is detected by the traction speed pickup 117 based on the rotation of the front wheel input shaft 72 and the sub transmission shaft 50.

As is clear from the above description and FIG. 5 through 8, etc., the transmission case 17 incorporates an input shaft 27 for transmitting power from the engine 5. The input shaft 27 is inserted into an output shaft 36 for relative rotation thereto. The input shaft 27 is provided with an encircling cylinder block 505, a hydrostatic pump portion 500 on one side of the cylinder block and a hydrostatic motor portion 501 on the other side of the cylinder block as part of a hydrostatic transmission 29. The hydrostatic motor portion 501 provides power via the output shaft 36 at least to right and left wheels 3, 4. The hydraulic motor portion 501 is placed between the input side of the input shaft 27 and the cylinder block 505, and the input side of the input shaft 27 and the output side of the output shaft 36 are on the side. This enables, for example, to secure a space for providing the hydrostatic transmission 29 at a rear of the transmission case 17 even if the tractor 1 has such a transmission structure that the traction sub transmission gear, the differential gear and the PTO speed shift gear, etc. are all provided inside the transmission case 17. A space is secured for e.g. the PTO speed shift gear, or traction sub transmission gear, etc. in front of the transmission case 17 which is on the input side of the input shaft 27, making possible to reduce the size or weight of the transmission case 17, for example, of the tractor 1, and to reduce manufacturing cost.

Also, the hydrostatic transmission 29 and the differential gear mechanism 58 which transmits power to the right and left wheels 4 are provided inside the transmission case 17. This enables compact layout of the hydrostatic transmission 29 through the use of idle space in the transmission case 17 which incorporates the differential gear mechanism 58, making possible to reduce the size or weight of the transmission case 17, for example, of the tractor 1, and to reduce manufacturing cost.

Also, inside of the transmission case 17 is partitioned into a front and the rear portions. The transmission gear mechanisms 30, 96 are disposed in the front portion inside the transmission case 17 while the hydrostatic transmission 29 and the differential gear mechanism 58 for transmission of power to the right and left wheels 4 are disposed in the rear portion inside the transmission case 17. This enables compact layout of the hydrostatic transmission 29 through the use of rear space in the transmission case 17 which incorporates the differential gear mechanism 58. Further, inside space of e.g. a box-shaped transmission case 17 is now used efficiently, with the transmission gear mechanisms 30, 96 such as the PTO speed shift gear or the traction sub transmission gear placed in the front portion of the transmission case 17, and the hydrostatic transmission 29 and the differential gear mechanism 58 being placed in the rear portion of the transmission case 17, enabling compact layout of the hydrostatic transmission 29. This makes possible to reduce the size or weight of the transmission case 17 for example, of the tractor 1, and to reduce manufacturing cost.

Next, description will cover assembling and disassembling of the hydrostatic transmission 29 to and from the transmission case 17. When assembling the hydrostatic transmission 29 to the transmission case 17, the hydrostatic transmission 29 is installed on the main-transmission input shaft 27. While the rear end of the main-transmission input shaft 27 is supported by a bearing 504 in the rear wall member 33, the assembly is placed into the transmission case 17 from the rear. The main-transmission input shaft 27 is inserted into the inner hole of the main-transmission output shaft 36, the main-transmission output shaft 36 is connected with the joint member 526 via the spline 528, and thus the hydrostatic transmission 29 is assembled into the transmission case 1. Inside the transmission case 17 is filled with an amount of hydraulic oil not smaller than a predetermined amount. The differential output shaft 62 is approximately at the same height as the hydraulic oil level (top surface). The hydrostatic transmission 29 is placed at a position higher than the axis of the differential output shaft 62. Therefore, the hydrostatic transmission 29 is above the level of the hydraulic oil filled in the transmission case 17.

On the other hand, when removing the hydrostatic transmission 29 from the main-transmission input shaft 27, hydrostatic transmission 29 is taken out of the transmission case 17, together with the main-transmission input shaft 27, with the end of the main-transmission input shaft 27 supported by the bearing 504 in the rear wall member 33. The joint member 526 connected with the main-transmission output shaft 36 via the spline 528 is detached from the main-transmission output shaft 36. The main-transmission input shaft 27 and the hydrostatic transmission 29 are taken out together with the rear wall member 33 while the main-transmission output shaft 36 is supported by the bearing 502 in the partition wall 31. Thus, these components are removed to the rear of the transmission case 17, and the hydrostatic transmission 29 is ready to be serviced.

As is clear from the above description and FIG. 5 through 8, etc., the transmission case 17 incorporates an input shaft 27 for transmitting power from the engine 5. The main transmission input shaft 27 is inserted into an output shaft 36 for relative rotation thereto. The input shaft 27 is provided with an encircling cylinder block 505, a hydrostatic pump portion 500 on one side of the cylinder block and a hydrostatic motor portion 501 on the other side of the cylinder block as part of a hydrostatic transmission 29. Power is transmitted from the hydrostatic motor portion 501, through the output shaft 36, to the differential gear mechanism 58. The power is then transmitted from the differential gear mechanism 58 to at least right and left wheels 3, 4. The hydrostatic transmission 29 and the differential gear mechanism 58 are incorporated in a rear portion of the transmission case 17, and the hydrostatic transmission 29 placed in the rear portion of the transmission case 17 is detachable therefrom and attachable thereto. This enables, for example, to secure a space for providing the hydrostatic transmission 29 at a rear of the transmission case 17 even if the tractor 1 has such a transmission structure that the traction sub transmission gear, the differential gear and the PTO speed shift gear, etc. are all provided inside the transmission case 17. The hydrostatic transmission 29 can be assembled and disassembled, with the differential gear mechanism 58 as assembled. A space is secured for e.g. the traction sub transmission gear-or the PTO speed shift gear, in front of the transmission case 17 which is on the input side of the input shaft 27, making possible to reduce the size or weight of the transmission case 17, for example, of the tractor 1, and to improve operability in e.g. assembling and disassembling, leading to reduced manufacturing cost.

Further, the output shaft 36 is supported by the bearing 502 rotatably inside the transmission case 17, while the swash plate 518 of the hydrostatic motor portion 501 and the output shaft 36 are connected by the spline 528 detachably in the axial directions of the input shaft 272. This enables to place the transmission gear mechanisms 30, 96 such as the traction sub transmission gear or the PTO speed shift gear in the front portion of the transmission case 17, and the hydrostatic transmission 29 and the differential gear mechanism 58 in the rear portion of the transmission case 171, through efficient utilization of the inside space of e.g. a box-shaped transmission case 17, enabling compact layout of the hydrostatic transmission 29, making possible to reduce the size or weight of the transmission case 17, for example, of the tractor 1, and to reduce manufacturing cost. The hydrostatic transmission 29 can be assembled or disassembled, with the hydrostatic pump portion 500 and the hydrostatic motor portion 501 sandwiching the cylinder block 505 and supported on the input shaft 27. The output shaft 36 is now supported in the transmission case 17, independently with respect to the hydrostatic transmission 29. The hydrostatic transmission 29 can now be assembled to and disassembled from the transmission case 17 while the output shaft 36 stays supported by the transmission case 17, providing a structure which allows easy assembly or disassembly of the hydrostatic transmission 29.

The invention claimed is:

1. A working vehicle comprising an engine frame for mounting an engine, a pair of right and left vehicle frames, and a transmission case, a rear portion of the engine frame being connected with front portions of the vehicle frames, the transmission case being placed between rear portions of the right and left vehicle frames, wherein the right and the left vehicle frames are connected via an upper connecting member and a lower connecting member, the engine having an output portion provided with a flywheel, the flywheel having an outer circumference surrounded by the right and the left vehicle frames and the upper and the lower connecting members, and wherein the vehicle frames have rear portions extended to side surfaces of the transmission case, the rear portion of the vehicle frame being penetrated by a frame pin from an outer side of the vehicle frame, the frame pin having a tip portion fitted into the side surface of the transmission case, the frame pin having a base portion provided with a pin fastening member, the pin fastening member being fastened to an outer side surface of the transmission case.

2. The working vehicle according to claim 1, further comprising wheels for running on a ground, wherein the transmission case incorporates an input shaft for transmitting power from the engine, the input shaft being inserted into an output shaft for relative rotation thereto, the input shaft being provided with an encircling cylinder block, a hydrostatic pump portion on one side of the cylinder block and a hydrostatic motor portion on the other side of the cylinder block as part of a hydrostatic transmission, the hydrostatic motor portion providing power via the output shaft at least to the wheels, the hydrostatic motor portion being disposed between an input side of the input shaft and the cylinder block, the input side of the input shaft and an output side of the output shaft being on a same side.

3. The working vehicle according to claim 2, further comprising a differential gear mechanism for transmission of power to the wheels, wherein the hydrostatic transmission and the differential gear mechanism are incorporated in a rear portion of the transmission case, the hydrostatic transmission being removable toward the rear of the transmission case.

4. The working vehicle according to claim 3, wherein the output shaft is rotatably supported by a bearing inside the transmission case, the hydrostatic motor portion having a swash plate connected with the output shaft detachably via splined connection in an axial direction of the input shaft.

5. The working vehicle according to claim 2, wherein the transmission case has its inside partitioned into a front and a rear portions, the front portion in the transmission case incorporating a transmission gear mechanism, the rear portion in the transmission case incorporating the hydrostatic transmission and a differential gear mechanism for transmission of power to the wheels.

6. The working vehicle according to claim 1, wherein the frame pin is penetrated by a tightening bolt from an outer side of the pin fastening member, the tightening bolt being threaded to the transmission case.

7. The working vehicle according to claim 1, wherein at least one of the pin fastening members is formed with a lid for attachment to an oil filter inside the transmission case.

8. The working vehicle according to claim 1, wherein a fixing member for fixing the engine and a bonnet is provided at an upper surface side of the upper connecting member.

9. The working vehicle according to claim 1, further comprising wheels for running on a ground, wherein the lower connecting member supports an intermediate bearing member for a driving shaft which transmits power from the transmission case to the wheels.

10. The working vehicle according to claim 1, wherein one of the right and the left vehicle frames is removable from the engine frame and the transmission case while the other of the vehicle frames stays connected to the engine frame and the transmission case.

* * * * *